(12) United States Patent
Bhattacharjee et al.

(10) Patent No.: US 7,236,974 B2
(45) Date of Patent: Jun. 26, 2007

(54) SYSTEM AND METHOD FOR A MULTI-LEVEL LOCKING HIERARCHY IN A DATABASE WITH MULTI-DIMENSIONAL CLUSTERING

(75) Inventors: Bishwaranjan Bhattacharjee, Yorktown Heights, NY (US); Leslie A. Cranston, Toronto (CA); Matthew A. Huras, Ajax (CA); Timothy R. Malkemus, Round Rock, TX (US); Catherine S. McArthur, Uxbridge (CA); Sriram K. Padmanabhan, Briarcliff Manor, NY (US); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 10/425,760

(22) Filed: Apr. 29, 2003

(65) Prior Publication Data
US 2004/0205066 A1     Oct. 14, 2004

(30) Foreign Application Priority Data
Apr. 8, 2003    (CA) .................................. 2425033

(51) Int. Cl.
G06F 17/30    (2006.01)
(52) U.S. Cl. ............... 707/8; 707/2; 707/9; 707/10; 709/210
(58) Field of Classification Search ............... 707/1–10, 707/101, 102, 103 R; 395/600
See application file for complete search history.

(56) References Cited

U.S. PATENT DOCUMENTS

| | | | |
|---|---|---|---|
| 5,355,477 A | 10/1994 | Strickland et al. ......... 395/600 |
| 5,414,839 A * | 5/1995 | Joshi ............................. 707/8 |
| 5,546,579 A | 8/1996 | Josten et al. ................ 395/600 |
| 5,551,046 A | 8/1996 | Mohan et al. .............. 395/800 |
| 5,742,813 A | 4/1998 | Kavanagh et al. .......... 395/608 |
| 5,761,659 A | 6/1998 | Bertoni ......................... 707/8 |
| 5,931,919 A | 8/1999 | Thomas et al. ............. 709/303 |

(Continued)

FOREIGN PATENT DOCUMENTS

JP    7084864 A    3/1995

OTHER PUBLICATIONS

"Concurrency System suitable for Distributed Databases." Jun. 1978, available at http://itirc.ibm.com:1211/SESS944588/GETDOC/290/1/1.

*Primary Examiner*—Khanh Pham
(74) *Attorney, Agent, or Firm*—Samuel A. Kassatly

(57) ABSTRACT

A multi-level locking hierarchy for a relational database includes a locking level applied to a multi-dimensionally clustering table, a locking level applied to blocks within the table, and a locking level applied to rows within the blocks. The hierarchy leverages the multi-dimensional clustering of the table data for efficiency and to reduce lock overhead. Data is normally locked in order of coarser to finer granularity to limit deadlock. When data of finer granularity is locked, data of coarser granularity containing the finer granularity data is also locked. Block lock durations may be employed to ensure that a block remains locked if any contained row remains locked. Block level lock attributes may facilitate detection of at least one of a concurrent scan and a row deletion within a block. Detection of the emptying of a block during a scan of the block may bar scan completion in that block.

34 Claims, 18 Drawing Sheets

U.S. PATENT DOCUMENTS

| | | | |
|---|---|---|---|
| 5,933,825 A | 8/1999 | McClaughry et al. | 707/8 |
| 5,956,712 A | 9/1999 | Bennett et al. | 707/8 |
| 6,026,401 A | 2/2000 | Brealey et al. | 707/8 |
| 6,144,983 A * | 11/2000 | Klots et al. | 718/104 |
| 6,304,873 B1 | 10/2001 | Klein et al. | 707/8 |
| 6,418,438 B1 * | 7/2002 | Campbell | 707/8 |
| 6,654,747 B1 * | 11/2003 | Van Huben et al. | 707/10 |
| 6,658,413 B1 * | 12/2003 | Reddy et al. | 707/8 |
| 6,772,155 B1 * | 8/2004 | Stegelmann | 707/8 |

* cited by examiner

MDC TABLE 30

| | DATE | COLOR | PROVINCE | |
|---|---|---|---|---|
| 202 | 1999/01/03 | RED | AB | |
| 204 | 1999/01/03 | BLUE | AB | |
| 206 | 1999/01/07 | RED | AB | BLOCK B1 |
| 208 | 1999/01/21 | GREEN | AB | |
| | ⋮ | | | |
| 210 | 1999/02/09 | RED | BC | |
| 212 | 1999/02/13 | BLUE | BC | BLOCK B2 |
| 214 | 1999/02/17 | YELLOW | BC | |
| | ⋮ | | | |
| 220 | 1999/01/23 | RED | AB | |
| 222 | 1999/01/24 | BLUE | AB | |
| 224 | 1999/01/26 | GREEN | AB | BLOCK B3 |
| 226 | 1999/01/28 | RED | AB | |
| | ⋮ | | | |
| | ⋮ | | | |

FIG. 2

MDC TABLE 30

PROVINCE

| | AB | BC | ON | QB |
|---|---|---|---|---|
| 9901 | B1, B3, B6, B12 | | B9, B19 | B11 ← 302 |
| 9902 | B5, B7, B8, B14 | B2, B15, B17 | B18 | B23 |
| 9903 | B10 | B4 | B16, B22 | B20 |
| 9904 | B13 | | B24 | B25 |

YEAR AND MONTH

FIG. 3

SYSTEM AND METHOD FOR A MULTI-LEVEL LOCKING HIERARCHY IN A DATABASE WITH MULTI-DIMENSIONAL CLUSTERING

PRIORITY CLAIM

The present application claims the priority of Canadian patent application, Serial No. 2425033, which is titled "Multi-Level Locking Hierarchy In A Database With Multi-Dimensional Clustering," which was filed on Apr. 8, 2003 with the Canadian Patent Office, by Bishwaranjan Bhattacharjee, Leslie A. Cranston, Matthew A. Huras, Timothy R. Malkemus, Catherine S. McArthur, Sriram K. Padmanabhan, and Michael J. Winer, and which is incorporated herein by reference.

FIELD OF THE INVENTION

The present invention generally relates to the field of databases, and more particularly to a locking hierarchy for use with relational databases.

BACKGROUND OF THE INVENTION

A database management system (DBMS) is a computer program that stores, retrieves, and deletes data from a database. One popular form of DBMS is a relational DBMS (abbreviated RDBMS), which is a DBMS that operates on a relational database. A relational database is a collection of data items organized as a set of formally described tables from which data can be accessed or reassembled in a variety of ways without necessitating a reorganization of the database's tables. Relational databases are considered to be particularly useful because they are relatively easy to create and access, and because new data categories can be added after creation of the original database without modifying existing database applications. An example of a commercially available RDBMS is DB2® from IBM Corporation.

Each table in a relational database comprises a set of rows or records. Each row is comprised of a number of columns that are essentially fields within records. Records may be grouped into pages that are written to and read from secondary storage as a unit.

Many concurrent processes may access an RDBM. In such environments, it is desirable for the RDBMS to maximize concurrency, and thus speed/efficiency, without sacrificing data stability. This is typically achieved by way of locks which are applied to data within the relational database as it is being accessed or updated. Locks cause the transactions of competing processes to be serialized in certain "dangerous" situations to ensure deterministic results and prevent the accessing of spurious data.

Locking is typically performed internally or "under the hood" of the database. This renders locking transparent to the database application developer and avoids burdening database application developers with the low-level details of locking and unlocking data. However, this does not mean that a developer has no control over the manner in which locks are applied. Many relational databases define a number of different isolation levels that may be applied to a database transaction. A transaction is a set of one or more database commands that is capable of either being committed or rolled back as a unit. Isolation levels are settings that determine how much a transaction is isolated from other transactions, that is, the degree to which other transactions are allowed to execute concurrently versus being serialized with respect to an executing transaction. Each different isolation level provides a different balance of concurrency and data stability. A developer may elect to have greater concurrency for certain transactions (e.g. when maximizing efficiency is important) and lesser concurrency for other transactions (e.g. when high data stability is paramount). Each isolation level sets database locks differently to achieve its particular balance.

For example, DB2® defines 4 isolation levels: Repeatable Read (RR), Read Stability (RS), Cursor Stability (CS), and Uncommitted Read (UR). These isolation levels provide varying degrees of concurrency/data stability, permitting, to varying degrees, the following "undesirable" results of contention for data by concurrent processes:

Uncommitted or "Dirty" Reads—the reading by a transaction of data that has been written by a concurrent uncommitted transaction, i.e., a concurrent transaction that has not completed and that could therefore be rolled back (e.g., if an error occurs).

Non-Repeatable Reads—a re-reading by a transaction of data that has been previously read by that transaction in the case where the data has been modified by a concurrent transaction which has committed since the initial read; and Phantom Reads—the re-execution of a query having a predicate (i.e. a search condition) by a transaction in which the returned set of rows has changed from the query's initial execution due to a concurrent, recently-committed transaction.

Known relational databases typically lock data at two levels of granularity (table and row) depending upon the chosen isolation level as well as the type of operation being performed, e.g., scan (i.e. read), insert, update, or delete. The exact manner in which the locks are applied may differ from database to database; those skilled in the art may be familiar with the locking scheme applied by the databases which they are skilled in using.

Disadvantageously, the number of ways in which locks may be used to balance concurrency and data stability using these locking approaches may be limited. This is especially true in a multidimensional clustering (MDC) environment in which data is physically clustered according to one or more keys or "dimensions" where each dimension can comprise one or more columns. What is needed is a new approach to database locking that is capable of balancing concurrency and data stability while guarding against undesirable data contention results while avoiding undue locking overhead (i.e. undue lock maintenance processing). The need for such a system has heretofore remained unsatisfied.

SUMMARY OF THE INVENTION

The present invention satisfies this need, and presents a system, a computer program product, and an associated method (collectively referred to herein as "the system" or "the present system") for providing, in a multidimensional clustering (MDC) environment, an approach for balancing concurrency and data stability while guarding against undesirable data contention results while avoiding undue locking overhead.

A level of locking is provided at the block level, where a block is a set of sequential pages on disk containing rows having a particular set of dimension values. In a typical embodiment, this level of locking is an intermediary locking level provided between the table and row levels. A typical multi-level locking hierarchy according to the present system has a first locking level applied to an MDC table, a second locking level applied to the blocks within the table; and a third locking level applied to the rows within the blocks. The block-level locking approach takes advantage of the data organization of multidimensional clustering to increase concurrency and efficiency of database operations while reducing locking overhead.

Objects in the locking hierarchy are normally locked in order of coarser to finer granularity to limit deadlock. When an object of finer granularity is locked, the object of coarser granularity that contains it may also be locked. To reduce the number of locks obtained, one stronger lock may be applied to the object of coarser granularity when it is determined that most or all of the contained data of finer granularity would otherwise require locks.

The data organization of the MDC table is used to determine which blocks of data may be accessed for operative database query predicates or search conditions. Dimension values are mapped to blocks using block indexes. These block indexes are employed to map predicates on dimension columns to particular blocks of data. This information is leveraged to determine the type and amount of locks necessary for the operations performed.

Isolation levels may also impact the type of locks to be applied at each locking level for various database operations. Various methods are demonstrated for optimizing multilevel locking to ensure the maintenance of isolation level semantics. An efficient technique is provided for ensuring the integrity of the locking hierarchy as scans move from block to block through the table and keeping or releasing block locks based on whether, in accordance with the isolation level, any rows within the blocks remain locked. Additional efficient techniques are presented for facilitating the detection of Repeatable Read scans or row deletions within a block to reduce the number of locks necessary for insert processing and row index processing, respectively.

The present system also provides method of protecting a block from being reused for a different set of dimension values while an Uncommitted Read (UR) scanner is in the block. This ensures that the UR scanner does not return invalid data if it has previously determined that the rows in the block belong to the original set of dimension values.

In accordance with one aspect of the present system there is provided a method of directing a database management system to lock data in a database having a multi-dimensionally clustered table with blocks of data physically clustered by dimension. This method comprises providing a locking level for individually locking the blocks of data physically clustered by dimension within the table.

In accordance with another aspect of the present system there may be provided a computer program product having a computer readable medium. This computer readable medium tangibly embodies a computer executable means for directing a database management system to lock data in a database having a multi-dimensionally clustered table with blocks of data physically clustered by dimension. This computer readable means may be stored in a computer readable medium of a data processing system. The computer program product comprises means for providing a locking level for individually locking the blocks of data physically clustered by dimension within the table.

In accordance with yet another aspect of the present system there is provided a data processing system having computer readable memory for containing a database and a database management system for locking data in the database. This database has a multi-dimensionally clustered table with blocks of data physically clustered by dimension. The data processing system comprises means for providing a locking level for individually locking the blocks of data physically clustered by dimension within the table.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 2 is a table illustrating a multi-dimensionally clustering (MDC) table of the relational database of FIG. 1;

FIG. 3 is a diagram illustrating the MDC table of FIG. 2 in an alternative representation showing the table's logical cells;

DETAILED DESCRIPTION OF PREFERRED EMBODIMENTS

Figure 1:
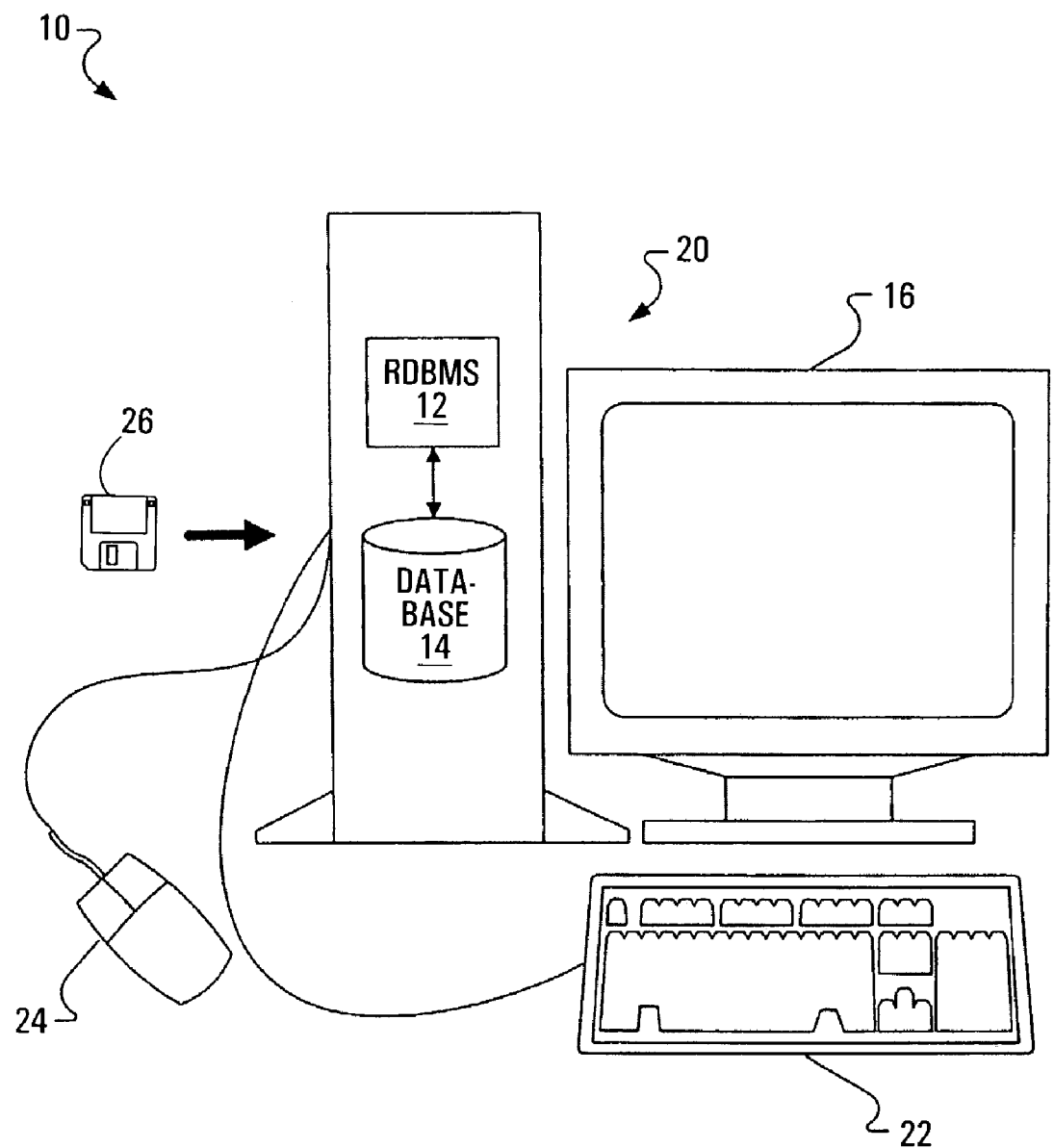
FIG. 1 is a schematic illustration of an exemplary relational database and relational database management system (RDBMS) in which a multi-level locking hierarchy system of the present invention can be used

FIG. 1 illustrates an exemplary database system 10 in which a system and method for a multi-level locking hierarchy in a database with multi-dimensional clustering of the present invention may be used. The database system 10 comprises a computing device 20 having a processor in communication with volatile memory as well as non-volatile memory (not illustrated). Computing device 20 comprises a display 16 and multiple input peripherals, such as a keyboard 22 and mouse 24, and may include hardware to network with other computers (not shown).

The volatile memory of the computing device 20 stores a relational database management system (RDBMS) 12. RDBMS 12 may be a commercially available RDBMS such as DB2® from IBM® that has been adapted to operate as described herein. The RDBMS 12 of the present embodiment is SQL compatible (i.e. capable of processing SQL commands or queries), but this is not a requirement. The RDBMS 12 may be loaded into database system 10 from a computer program product 26 having a computer readable medium, which could be an optical or magnetic disk, tape, or chip for example, storing instructions for executing methods exemplary of this invention.

The non-volatile memory of computing device 20 (also referred to as "secondary storage" and typically being a hard disk drive) stores a relational database 14 accessible by way of the RDBMS 12. The relational database 14 stores data in a multi-dimensional clustering (MDC) table, as represented by the exemplary MDC table 30 shown in FIG. 2. As known by those skilled in the art, an MDC table 30 is a table in which data is physically clustered according to one or more keys that are also referred to as "dimensions". Each dimension can comprise one or more columns. Each unique value in the domain of key values (i.e. each unique set of dimension values) represents a logical "cell" of the MDC table 30. That is, a "cell" refers to a unique set of dimension key values from this description, as opposed to a "slice" which is a distinct key value for one particular dimension (as will be described). In secondary storage, each cell comprises one or more fixed size "blocks", where each block contains data for only one cell. Each block of the present embodiment has the same extent size and is thus capable of containing the same number of pages (i.e. fixed-size groupings of rows) and rows as all other blocks. However, alternative embodiments may have blocks with different extent sizes. The number of blocks within the MDC table 30 can fluctuate over time. Blocks may be emptied and remain part of the MDC table 30.

The MDC table 30 stores rows having columns, namely DATE, COLOR and PROVINCE. Each row has a unique identifier or "row ID" (abbreviated "RID"); these are not shown in FIG. 2. The MDC table 30 may be created by way of the following SQL statement, for example:

CREATE TABLE MDC (DATE DATE, COLOR VARCHAR(10),
PROVINCE CHAR(2), YEARANDMONTH generated as DATENUM(Date)/100, . . . )
DIMENSIONS (YEARANDMONTH, PROVINCE)

The DIMENSIONS clause specifies YEARANDMONTH and PROVINCE as the dimensions of the MDC table 30. YEARANDMONTH is understood to be a concatenation of the two-digit year and two-digit month from the DATE column.

Three exemplary physical blocks B1, B2, B3 illustrating the structure of the MDC table 30 are shown in FIG. 2. Additional blocks of the MDC table 30 are not illustrated. The ordinal positions of the blocks in FIG. 2 represent the ordering of the blocks when stored in secondary storage. As exemplified by the alphanumerics B1, B2, B3, each block has an identifier or "block ID" (abbreviated "BID") comprising the block's ordinal position with a "B" prefix. A block maintains its BID regardless of whether it contains any data or is part of a logical cell.

The first block B1 contains data for cell (9901, AB), i.e., YEARANDMONTH "9901" and PROVINCE "AB". As can be seen in FIG. 2, each of the four rows 202, 204, 206 and 208 of block B1 has a date value which falls within the YEARANDMONTH "9901" and a province value which equals "AB". It is understood that additional rows may exist within the block B1 despite not being illustrated.

The second block B2, which includes rows 210, 212 and 214, contains data for cell (9902, BC), i.e., YEARANDMONTH "9902" and PROVINCE "BC".

The third block B3, which includes rows 220, 222, 224 and 226, contains more data for cell (9901, AB). This block B3, in conjunction with block B1, illustrates the fact that it is not necessary for all blocks associated with a cell to be contiguously stored on disk.

An alternative representation of the MDC table 30 showing the logical partitioning of blocks such as blocks B1, B9, B11, etc. into cells is illustrated in FIG. 3. Each square in the grid represents a logical cell such as cell 302. A column such as column AB or row such as row 9901 in the grid represents a "slice" for a particular dimension, i.e., a set of blocks that contain rows having a unique key value of one of the dimensions. Each block is represented by an oval containing a block identifier that is situated within the cell with which the block is associated. Twenty-four blocks (B1, B3, B9, etc.) are represented in FIG. 3. These blocks are understood to contain at least one row of data each. The MDC table 30 may contain additional blocks that are absent from the grid because they are presently empty and not associated with any cell.

Also included in the database system 10 is a block map (not illustrated). A block map is a data structure associated with the MDC table 30 in which the status of each block is recorded. Possible statuses for a block are "in use", i.e., containing at least one row of data, and "free", i.e., empty and available for use.

Figure 4:
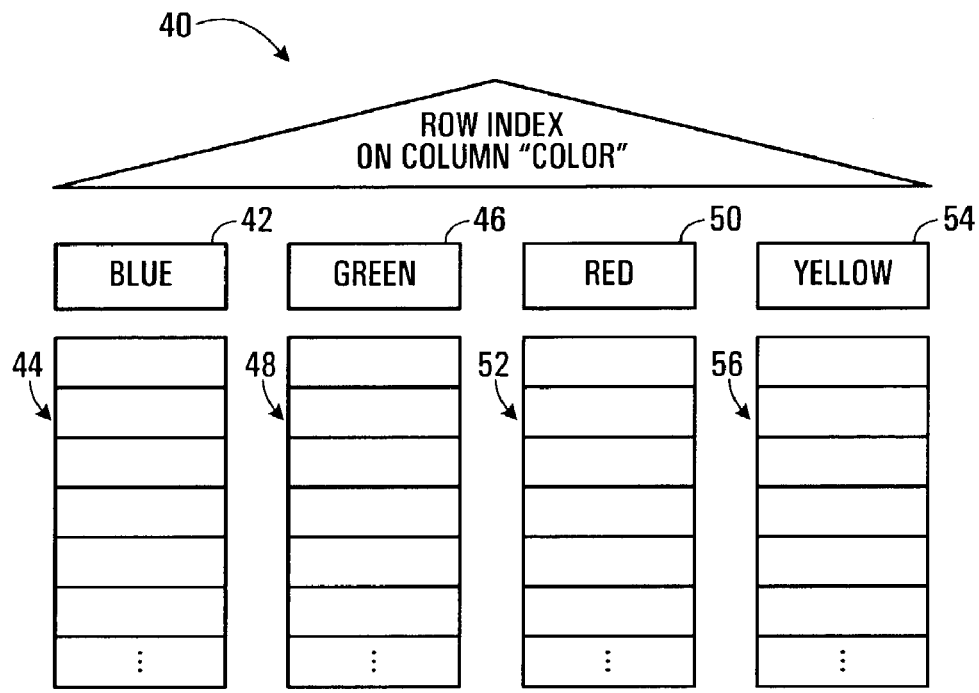
FIG. 4 is a diagram illustrating a row index of the database system of FIG. 1.

The database system 10 includes a row index 40, illustrated in FIG. 4. The row index 40 (or at least a portion of row index 40) resides in volatile memory of the database system 10 during operation. As known by those skilled in the art, a row index is a list of the locations of rows in a table sorted by the contents of one or more specified columns. Row indexes promote efficiency by allowing effective searches for rows that meet search criteria within the specified columns. The row index 40 provides an alternative approach to satisfying a query other than a table scan, i.e. a scan of every row of a table. The row index 40 is regularly updated during database manipulation to reflect the current state of database system 10. As will be described, the row index 40 of the present embodiment differs from known row indexes in terms of the locking involved in accessing and maintenance of keys.

The exemplary row index 40 of FIG. 4 is based on the second column of MDC table 30, "COLOR". Of course, row indexes may be created on other columns or combinations of columns. Creation of this particular row index 40 may be motivated by an expectation that database queries may commonly have predicates involving the COLOR column of MDC table 30. Each unique key value of the COLOR column appearing in the MDC table 30, namely "BLUE", "GREEN", "RED" and "YELLOW", is represented as a key of the index 40 at 42, 46, 50, and 54 respectively. Index keys are ordered (i.e. sorted, in this case alphabetically). This ordering facilitates the processing associated with "bracketed" index scans (i.e. row index scans that are limited in range), e.g. if a query predicate sets a range for a column on which the row index 40 is based. Ordering may eliminate the need to sort output after the scan.

Associated with each distinct key value 42, 46, 50 and 54 is a list of RIDs (or "RID list") 44, 48, 52 and 56 (respectively) identifying the rows in which the COLOR column value has the associated key value. For example, RID list 44 includes the row ID of each row of the MDC table 30 having the value "BLUE", such as rows 204, 212 and 222 for example (actual row IDs are not shown in the RID list 44 of FIG. 4). The row IDs within each RID list are sorted by number.

Figure 5A:
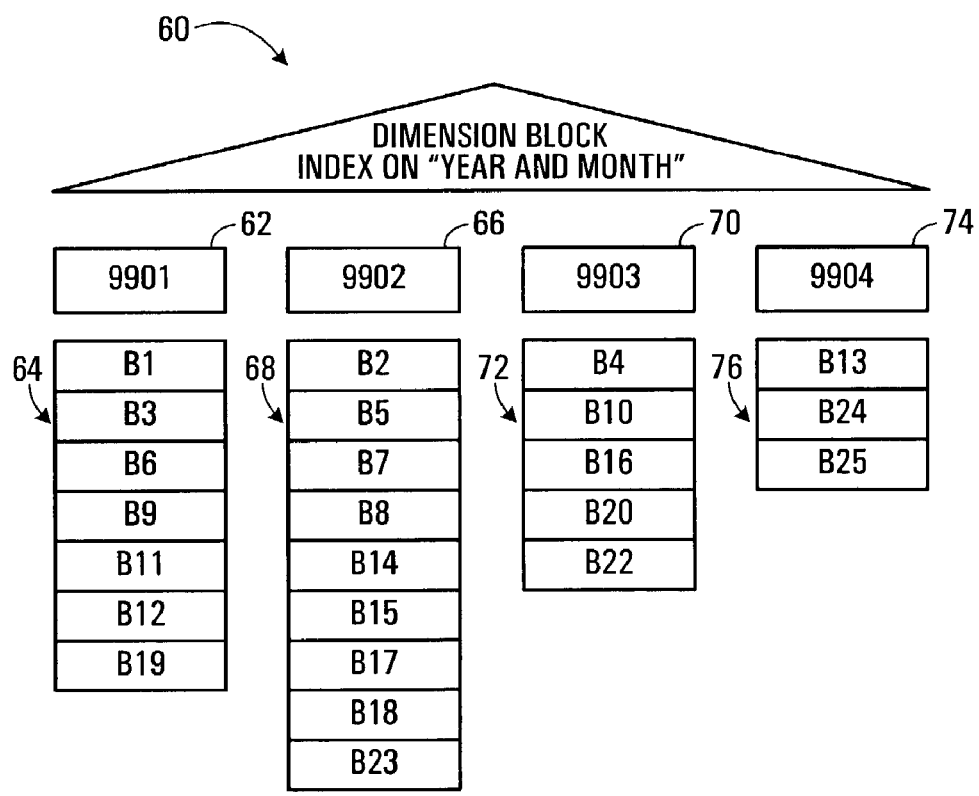
FIG. 5 is comprised of FIGS. 5A and 5B, and represents a diagram illustrating dimension block indexes of the database system of FIG. 1.
Figure 5B:
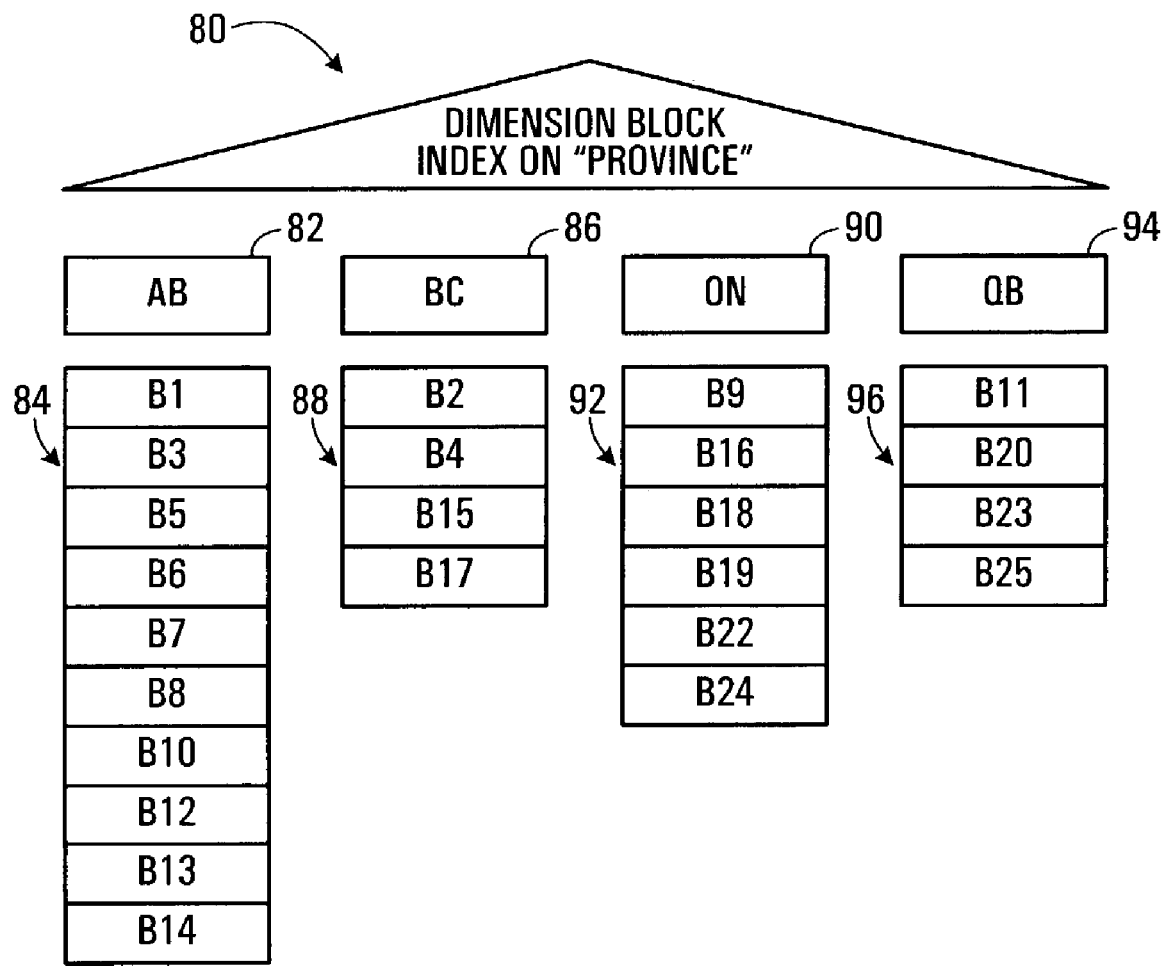

FIG. 5 (FIGS. 5A, 5B) illustrates dimension block indexes such as dimension block 60 that are automatically created in volatile memory for each of the specified dimensions of the MDC table 30 when the MDC table 30 is created. A dimension block index is a data structure that is similar to a row index except that it operates on blocks as opposed to rows. A distinction between row indexes and dimension block indexes is that a row index requires updating when a row is added to an existing block, whereas a dimension block index does not require updating in this situation. Dimension block indexes facilitate the accessing of data along a particular dimension, e.g., when a database query has a dimension predicate (i.e. a predicate that operates on the one or more columns that forms a dimension of the MDC table 30). In the present example, dimension block index 60 of FIG. 5A is associated with the YEARANDMONTH dimension while the dimension block index 80 of FIG. 5B is associated with the PROVINCE dimension.

Referring to FIG. 5A, each unique YEARANDMONTH dimension value presently contained in the MDC table 30, namely, "9901", "9902", "9903" and "9904", is represented as a key in the dimension block index 60 at 62, 66, 70, and 74 respectively. These keys are ordered (i.e. sorted numerically). The rationale for ordering keys in the dimension block index is similar to the rationale for ordering the key values of row index 40 (FIG. 4). Associated with each distinct dimension value 62, 66, 70, and 74 of dimension block index 60 is a list of BIDs (or "BID list") 64, 68, 72 and 76 (respectively) identifying the blocks in which the YEARANDMONTH value has the associated dimension value, sorted in ascending order by BID. For example, BID list 64 includes the ID of each block contained within the "9901" slice (horizontal row) of the MDC table 30 (FIG. 3).

Turning to FIG. 5B, the dimension block index 80 has an analogous structure to dimension block index 60, except that it is based on the PROVINCE dimension rather than the YEARANDMONTH dimension. The index 80 includes four distinct key values, "AB", "BC", "ON", and "QB" at 82, 86, 90 and 94 respectively. Each of these keys has an associated BID list 84, 88, 92 and 96 (respectively), which is associated with a slice (vertical column) of the MDC table 30 (FIG. 3).

Figure 6:
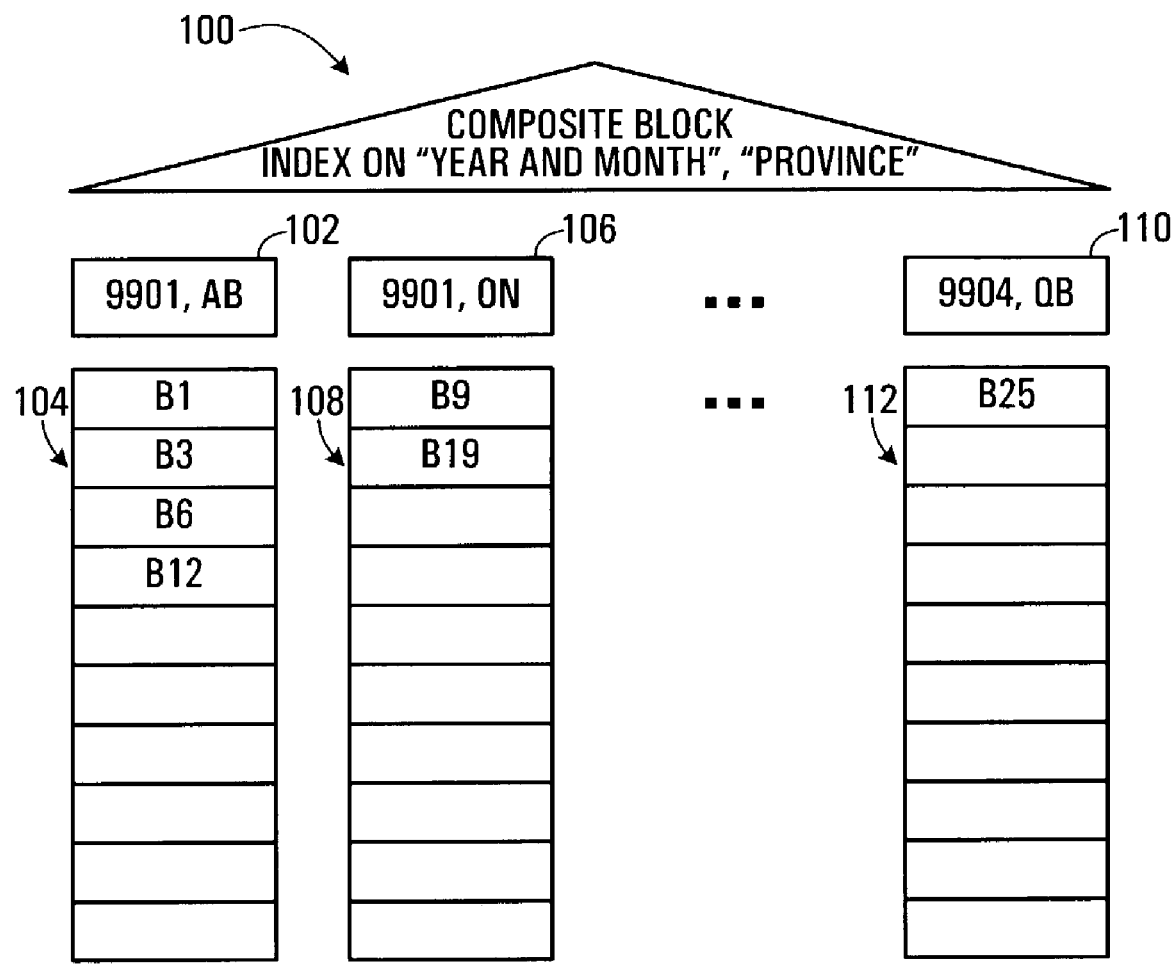
FIG. 6 is a diagram illustrating a composite block index of the database system of FIG. 1.

FIG. 6 illustrates a composite block index 100 that is also automatically created when the MDC table 30 is created. The composite block index 100 facilitates the accessing of data associated with a particular logical cell and may thus be thought of as a cell index. The composite block index 100 includes keys for each unique combination of dimension values presently existing in the MDC table 30. Each key in the block index 100 is thus associated with a particular cell. Only non-empty cells (i.e. cells containing at least one block) have an associated key in the composite block index 100. For example, the block index 100 includes key 102 for the cell (9901, AB) and key 106 for the cell (9901, ON) respectively, but lacks a key for cell (9901, BC), since the latter cell is empty (as shown in FIG. 3). A total of three exemplary keys 102, 106, and 110 are illustrated in FIG. 6, with other keys being omitted for brevity. Each of the illustrated keys 102, 106 and 110 has associated with it a BID list 104, 108 and 112 (respectively) identifying the blocks contained in that cell, within which BIDs are sorted in ascending order.

Each of the row index 40, dimension block indexes 60 and 80, and composite block index 100 may be implemented in the form of a B–Tree or B+Tree data structure to facilitate efficient searches for a desired key. The use of these data structures to implement row indexes is well known.

The RDBMS 12 of the present embodiment allows the use of cursors. As known by those skilled in the art, a cursor is a pointer to a row in a collection of rows that have been returned by a query declaring the cursor. A cursor allows a database application to advance through a set of rows retrieved with a SELECT statement.

The RDBMS 12 employs a query optimizer. As known by those skilled in the art, a query optimizer (or simply "optimizer") is a functional module that receives a database query and generates or selects therefrom an optimal access plan determining how the database system 10 may be accessed to fulfill that query. In the present embodiment, the optimizer determines how database locks are to be applied at the table, block, and row levels based on a user-specified isolation level for a database query or set of queries. In the present embodiment, four isolation levels are defined: Repeatable Read, Read Stability, Cursor Stability, and Uncommitted Read.

Repeatable Read (RR)—Repeatable Read locks all the rows that an application references within a unit of work. For example, if 10,000 rows are scanned and predicates applied, locks are held on all 10,000 rows, even though only 10 rows may qualify predicates. Using Repeatable Read, a SELECT statement issued by an application twice within the same unit of work in which the cursor was opened gives the same result each time. RR guards against lost updates, access to uncommitted data, and phantom rows. The RR application can retrieve and operate on the rows as many times as needed until the unit of work completes. However, no other applications can update, delete, or insert a row that would affect the result table, until the unit of work completes. RR applications cannot see uncommitted changes of other applications. With Repeatable Read, every row that is referenced is locked, not just the rows that are retrieved. Appropriate locking is performed so that another application cannot insert or update a row that would be added to the list of rows referenced by the query, if the query was re-executed.

Read Stability (RS)—Read Stability locks only those rows that an application retrieves within a unit of work. For example, if 10,000 rows are scanned and predicates applied, and only 10 rows qualify, RS only locks the 10 qualifying rows. RS ensures that any qualifying row read during a unit of work is not changed by other application processes until the unit of work completes, and that any row changed by another application process is not read until the change is committed by that process. That is, RS guards against "non-repeatable read" behavior. Unlike Repeatable Read, additional phantom rows (the "phantom read" phenomenon) may occur with Read Stability if an application issues the same query more than once.

Cursor Stability (CS)—Cursor Stability locks any row accessed by a transaction of an application while the cursor is positioned on the row. This lock remains in effect until the next row is fetched or the transaction is terminated. However, if any data on a row is changed, the lock is held until the change is committed to the database system 10. For example, if with Cursor Stability 10,000 rows are scanned, a lock may only exist on the row under the current cursor position. The lock is removed when the cursor moves off that row (unless that row has been updated). Other applications are prevented from updating or deleting a row that a CS application has retrieved while any updateable cursor is positioned on the row. Uncommitted changes of other applications are not visible to Cursor Stability applications. With Cursor Stability, both non-repeatable read and the phantom read phenomenon are possible.

Uncommitted Read (UR)—Uncommitted Read allows an application to access uncommitted changes of other transactions. The UR application does not lock other applications out of a row being read, unless another application attempts to drop or alter the MCD table 30. Uncommitted Read works differently for read-only and updateable cursors. Read-only cursors may access most uncommitted changes of other transactions. However, tables, views, and indexes that are being created or dropped by other transactions are not available while the transaction is processing. Any other changes by other transactions can be read before they are committed or rolled back. With UR, uncommitted reads, non-repeatable reads, and phantom reads are possible.

The present embodiment may apply to locks at the table, block and row levels, and to keys within the row index 40, dimension block indexes 60 and 80, and composite block index 100. These lock types are described in Table I below.

TABLE 1

Lock Types

| Lock Mode | Applicable Object Type | Description |
| --- | --- | --- |
| Intent None (IN) | Table spaces, blocks, tables | The lock owner may read any data in the object, including uncommitted data, but may not update any of it. Other concurrent applications may read or update the MDC table. |
| Intent Share (IS) | Table spaces, blocks, tables | The lock owner may read data in the locked MDC table, but may not update this data. Other applications may read or update the MDC table. |
| Intent Exclusive (IX) | Table spaces, blocks, tables | The lock owner and concurrent applications may Exclusive read and update data. Other concurrent applications may both read and update the MDC table. |
| Share (S) | Rows, blocks, tables | The lock owner and all concurrent applications may read, but not update, the locked data. |
| Update (U) | Rows, blocks, tables | The lock owner may update data. Other units of work may read the data in the locked object, but may not attempt to update it. |
| Share with Intent Exclusive (SIX) | Tables, blocks | The lock owner may read and update data. Other concurrent applications may read the MDC table. |
| Exclusive (X) | Rows, blocks, tables, buffer pools | The lock owner may both read and update data in the locked object. Only uncommitted read applications may access the locked object |
| Superexclusive (Z) | Table spaces, tables | This lock is acquired on a MDC table in certain tables conditions, such as when the MDC table is altered or dropped, an index on the MDC table is created or dropped, or for some types of MDC table reorganization. No other concurrent application may read or update the MDC table. |

The lock types of Table I are known to those skilled in the art. Alternative embodiments may not employ exactly the same lock types.

A compatibility matrix is shown in Table 2 for the locks enumerated above. Column headings represent the lock type of an existing lock on a unit of data (e.g. MDC table 30, block or row) while row headings represent lock types desired by a concurrent process for the already-locked unit of data. A "Y" at an intersection of a row and column indicates that the existing lock (indicated by the column heading) and the desired lock (indicated by the row heading) are compatible, while an "N" indicates incompatibility. As locks are added to an object, there is a union of the compatibilities. The result of the union may be a lock that is at least as strong as the strongest of the individual locks in the union. Otherwise, the resulting lock may be the same or less compatible (with all other locks) than the lock that was least compatible of the set in the union.

TABLE 2

Lock Compatibility Matrix

|  | IN | IS | IX | S | U | SIX | X | Z |
| --- | --- | --- | --- | --- | --- | --- | --- | --- |
| IN | Y | Y | Y | Y | Y | Y | Y | N |
| IS | Y | Y | Y | Y | Y | Y | N | N |
| IX | Y | Y | Y | N | N | N | N | N |
| S | Y | Y | N | Y | Y | N | N | N |
| U | Y | Y | N | Y | N | N | N | N |
| SIX | Y | Y | N | N | N | N | N | N |
| X | Y | N | N | N | N | N | N | N |
| Z | N | N | N | N | N | N | N | N |

A database lock may have one or more attributes (i.e. characteristics) that may be implemented as flags or other indicators. It may be appreciated that an attribute is a form of indicator. Two lock attributes in particular are used in the present embodiment to reduce lock overhead: DELETE_IN_BLOCK and RR_IN_BLOCK. The DELETE_IN_BLOCK attribute is set for a block-level lock to indicate that a delete operation is occurring on a row within the block. The RR_IN_BLOCK attribute is set for a block-level lock to indicate that a Repeatable Read scan operation has a lock on a row within the block. Other attributes which may be applied to block-level locks include the DELETE and RR attributes, which are known in the art. The operations which set/examine these attributes will be described subsequently.

In overview, the locking hierarchy of the present embodiment generally locks data in order of coarser to finer granularity to limit deadlock. When data of finer granularity is locked, data of coarser granularity containing the finer granularity data is also locked, often with an "intent" or weaker lock. When it is determined that most or all of the contained data of finer granularity (e.g. rows within the block) require locking, a single "non-intent" or stronger lock may be applied to data of coarser granularity (e.g. to a block). This avoids the need to lock contained finer-granularity objects.

In the sections that follow, the operation of the three-level locking hierarchy of the present embodiment may be described in terms of the following common database operations: (1) Insert; (2) Update; (3) Delete; and (4) Scan.

(1) Insert

Insertion of a row into the MDC table 30 may require several separate types of insert operations:

(a) Insertion of the row into the MCD table 30;

(b) Insertion of a BID into a block index (in the case where a new block is being added to the MDC table 30); and (c) Insertion of a RID into a row index (when a row index exists, as in the present embodiment).

These operations are described in the subsections that follow.

(1)(a) Insert Row

When inserting a row into the MDC table 30, it is desirable to provide a high level of concurrency while providing exclusive access to the block into which the row is being inserted if the block must first be assigned to the target cell. This is achieved by the row insert operation 700 illustrated in FIGS. 7A and 7B.

Figure 7A:
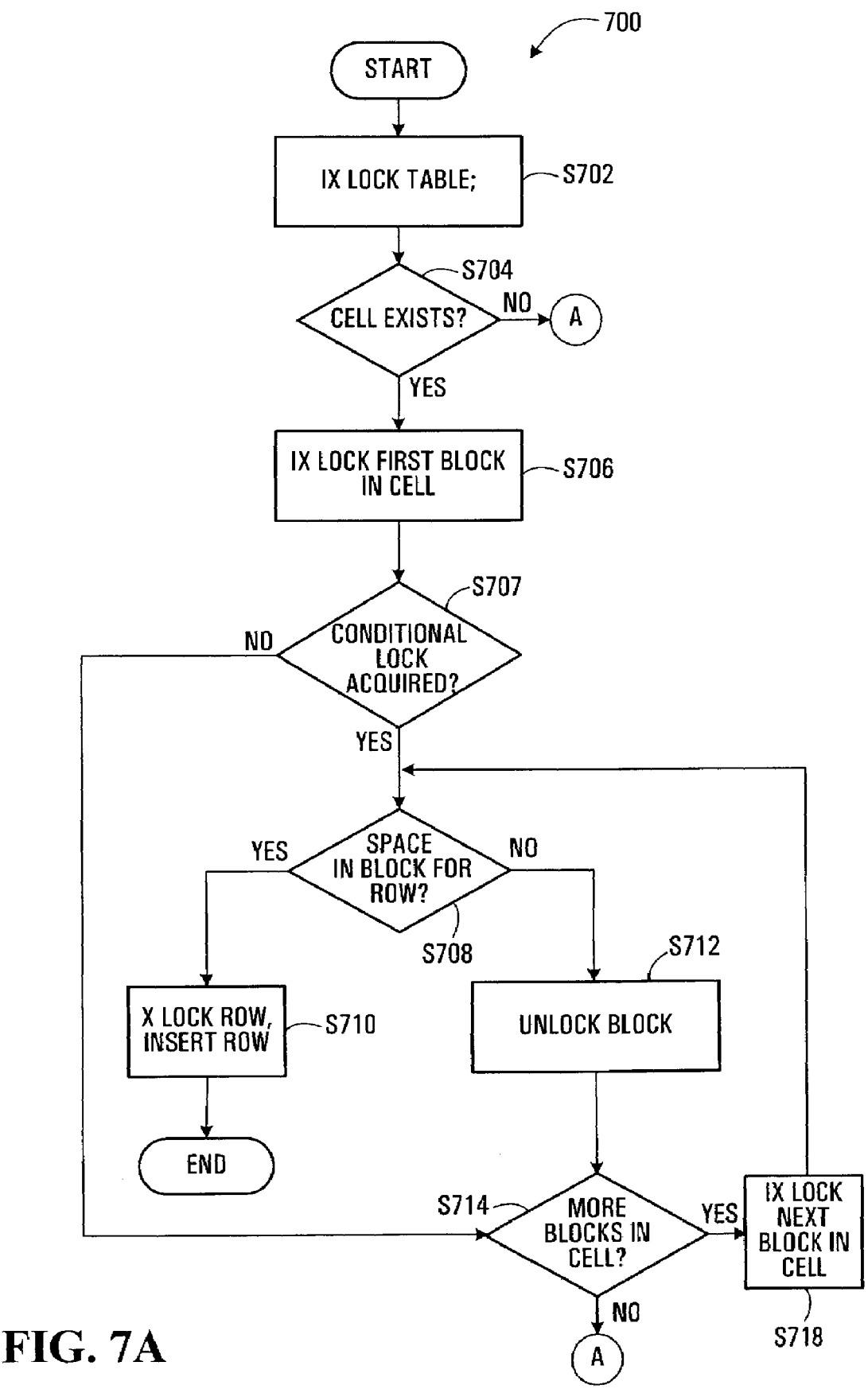
FIG. 7 is comprised of FIGS. 7A and 7B, and represents a process flow chart illustrating a method of operation for inserting a database row performed by the database system of FIG. 1.

Referring to FIG. 7A, initially the MDC table 30 is locked IX (S702) to indicate an intention to write a row into the MDC table 30. Next, it is determined whether the cell within which the to-be-inserted row belongs already exists in the MDC table 30 (S704). In this step, the composite block index 100 is scanned for a key having values corresponding with the to-be-inserted row's dimension values. During this scan of the index 100, scanned BIDs are conditionally locked IX. Conditional locking means that a check is performed as to whether the lock may be acquired, and if the lock cannot be acquired there is no waiting on the lock.

If it is determined (in S704) that the cell does in fact exist in the MDC table 30, the first block for that cell is IX locked (S706). This block is identified by way of the BID list associated with the appropriate composite block index key. If the conditional lock is not acquired (S707), this BID is skipped, and processing continues with S714 (see below). Otherwise, it is determined whether sufficient space exists in the identified block for the to-be-inserted row (S708). If sufficient space exists, the row is locked X and inserted into the block (S710), completing operation 700. It may be appreciated that the dimension block indexes 60, 80 and composite block index 100 need not be updated in this case because no new blocks are added to the MDC table 30. However, row index 40 does require updating (as described in subsection (1)(c) "Insert RID into Row Index"). If there is insufficient space for the row in the block (S708), the block is unlocked (S712). It is determined if any blocks identified in the BID list associated with the composite block index key remain (S714). If so, these remaining blocks are checked for sufficient space in the same manner (S718, S708). As before, if a block with sufficient space is found (S708), the row is locked X and inserted into the block (S710), completing operation 700.

If no existing block within the cell is found to have sufficient space for the to-be-inserted row, or if is determined (in S704) that the cell does not in fact have any blocks existing in the MDC table 30, a block should be acquired and assigned to the cell. That is, an empty block should be found or a new block allocated to the MDC table 30. In this case, an exclusive or superexclusive lock is applied to the new block during the assignment such that other processes insert no other rows. This allows the assignment to be undone if the transaction rolls back before completion. If the transaction performing the insert operation previously disassociated the target block from a different logical cell, a superexclusive lock is used and special considerations pertaining to transaction rollback apply. If the transaction is not reusing a block it has previously disassociated from a cell, the block can be X locked while it is being added to the cell and then downgraded to IX to allow more concurrency to the block once the record is inserted. In this case, it should be ensured that the block's assignment to the cell is not undone during rollback processing. This is illustrated in FIG. 7B.

Figure 7B:
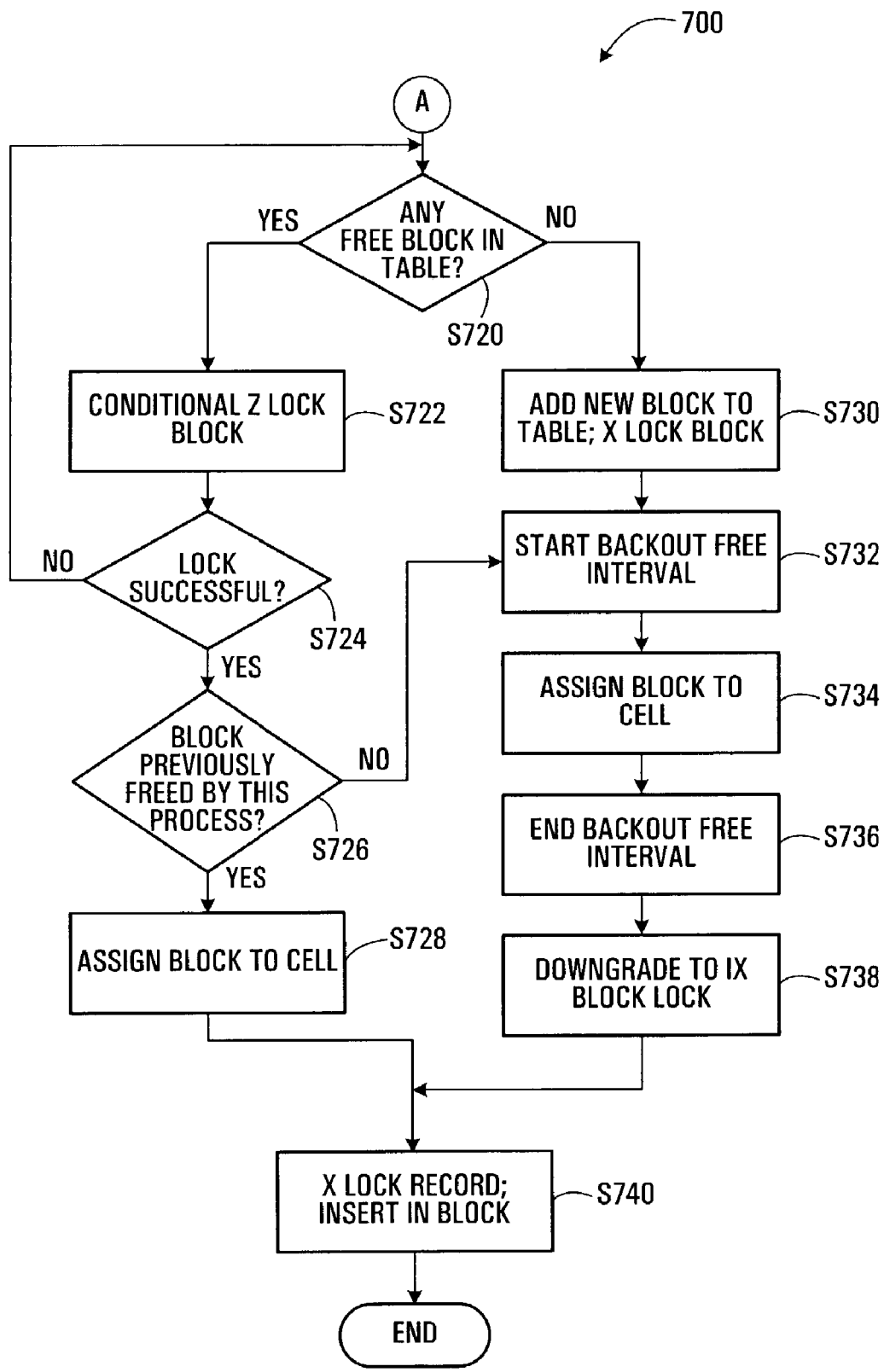

As shown in FIG. 7B, initially the block map is consulted to determine whether a free block exists within the MDC table 30 (S720). This is achieved by scanning the block map for blocks having a "free" status. If a free block is found, the block is conditionally locked Z (S722). Z locking is used to protect UR scanners that may be in the block or may get in otherwise, because the cell to which the block belongs may change and the IN scanner may assume the block belongs to the original cell. The Z lock conflicts with IN locking performed by UR scans on blocks, as described herein. The Z lock needs only be used when it is determined that the block was previously X locked by this transaction. That is, this transaction previously emptied the block and disassociated it from its cell, as only in this case is it possible for UR scans to be impaired.

If the conditional lock cannot be acquired (S724), which may be the case if another process holds any other lock on that block (see Table 2 above), the search continues for another free block (S720). If the lock is in fact successfully acquired, it is next determined whether the block was previously freed by this transaction (S726). This determination may be made, for example, by ascertaining whether an exclusive X lock was held on this block previously. This would indicate that the instant transaction has just emptied the block and disassociated it from another cell. The lock may only be acquired if the X lock is not held by another transaction, such that it is known that this transaction previously acquired the X lock on the block. In addition, this transaction may have added this block to the cell, or removed it, as those are the only operations that would provide an X lock on the block, assuming no block level escalation has occurred.

If this process previously freed the block, only the current transaction should be permitted to add rows to the block. In the event of transaction rollback, all the rows in the new block are thus ensured to be those of the current transaction, and may be removed if reassignment of the block to its former cell is necessary. For this reason, the Z lock is left on the block. The block is assigned to the cell (S728). Assigning a block to a cell entails setting the block map entry associated with the block to reflect the fact that the block is in use and adding the BID of the block to the dimension block indexes 60 and 80 as well as the composite block index 100. The row is then locked with an X lock and inserted into the block (S740). This completes the operation 700.

If it is instead determined (in S726) that an X lock was not previously held, i.e. that the instant transaction has not previously emptied the block and disassociated it from another cell, a backout-free interval is started (S732). As known in the art, a backout-free interval is a database setting applied to a set of operations which specifies that if the set of operations are completed as a unit, they may not be rolled back. Only if the set does not complete as a whole may that portion that did complete be rolled back. The block is then assigned to the cell (S734) and the backout-free interval is terminated (S736). Assigning a block to a cell entails setting the block map entry associated with the block to reflect the fact that the block is in use and adding the BID of the block to the dimension block indexes 60 and 80 as well as the composite block index 100.

The rationale for the backout free interval is that the lock may be downgraded to IX in S738. If the transaction that successfully assigned the block to the cell rolls back, it should not de-assign the block from the cell. The cell may not be empty, as other transactions may have also added rows to the block since the lock was downgraded. However, if the transaction rolls back before the assignment of the block to the cell is complete, the partial assignment should be undone.

Thereafter the block lock is downgraded from Z to IX (S738) to allow concurrent processes to perform row inserts into the cell before the instant transaction commits. This increases concurrency over the level of concurrency achievable if a Z lock were maintained until the transaction was committed. The row is then locked with an X lock and inserted into the block (S740), completing the operation 700.

If a free block is not found (S720), a new block is added to the MDC table 30 and the block is locked with an X lock (S730). Addition of the block to the MDC table 30 may for example entail physically appending the block to the end of the MCD table 30 and then adding an entry for the new block to the block map while the X lock is held. An X lock can be used since a UR scanner may not enter into the block under the assumption that it belongs to a different cell. The operation then proceeds to completion as described above (S732 to S740).

(1)(b) Insert BID Into Block Index

When a row is inserted into MDC table 30, it may be necessary to allocate a new block to the MDC table 30 or to reuse a freed block (an empty block that is not currently associated with any cell). In this case, the new block's BID is inserted into the dimension block index 60, 80 and composite block index 100 as a new key. However, this BID key insert operation should not be permitted to affect the outcome of any concurrent RR scan operation that is being performed on a range of BIDs including the newly inserted BID, to ensure that the RR scan is in fact repeatable.

To this end, during an RR scan of a set of BIDs in a block index, all of the examined BIDs are locked with an RR attribute being applied to each lock to reflect the RR scan. Also locked is the next highest BID in the index that is beyond the BIDs falling within the scan range. This avoids the insertion of a BID key that is higher than the highest existing BID but still properly within the examined range, which may cause a repeated read to return spurious results.

Figure 8:
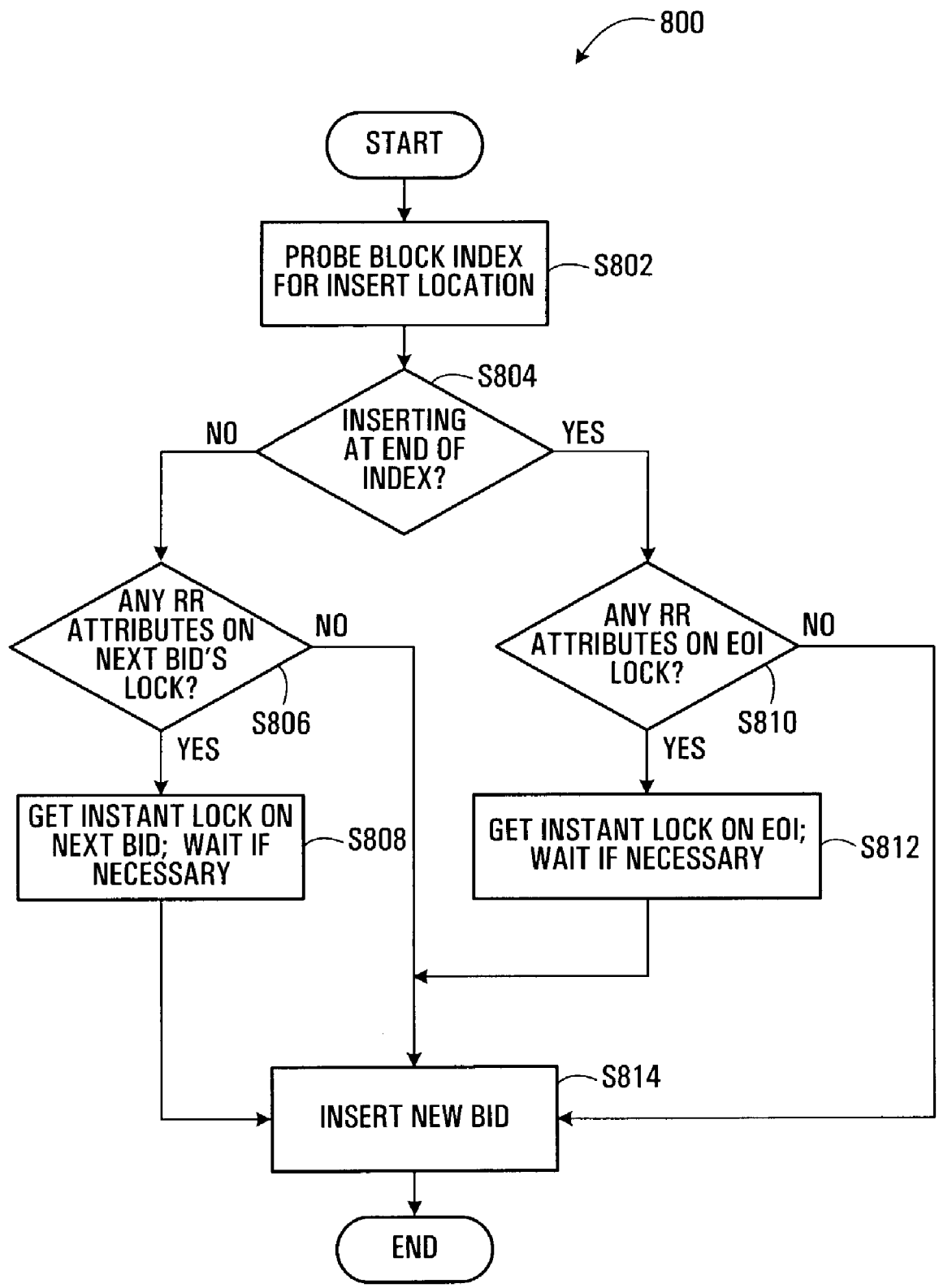
FIG. 8 is a process flow chart illustrating a method of operation for inserting a block identifier (BID) key into a block index of the database system of FIG. 1.

Operation 800 for inserting a BID into a block index to address this RR scan issue is shown in FIG. 8. Essentially, operation 800 checks the lock associated with the next highest BID beyond the insertion point of the to-be-inserted BID within the block index for an attribute indicating that an RR scan is ongoing within the block. Operation 800 then acquires an "instant" lock (i.e. a lock that is immediately released once acquired) on that next highest BID only when that attribute is found, to ensure that the RR scan completes before the BID is inserted. A goal of operation 800 is to avoid unnecessary locking when corruption of an RR scan is not a concern. In this context "locking a BID" may refer to the locking of the associated block.

As shown in FIG. 8, initially the index is probed for the proper BID insert location (S802). If it is determined that the insertion point is not at the high end of the index (S804), a check is made as to whether any RR attributes have been set on the lock of the next BID by a concurrent transaction (S806). This would an RR scan of the block index in the relevant range is ongoing. For example, detection of a concurrent transaction may occur when a locking attempt by this transaction conflicts with locks already held on an object, which evidences at least one other transaction that has not yet committed and has already locked the object in question If no such RR attributes exist, there is no need to perform next key locking (because corruption of a concurrent RR scan is not a concern in this situation). Consequently, the BID is simply inserted (S814). However, if an RR attribute is found to have been set by a concurrent transaction, an instant lock is requested on the next BID key in the index, with the present BID key insert transaction waiting as necessary (S808). Once this lock is granted (indicating any concurrent RR scan is completed), the BID is inserted (S814).

If it is determined that the insertion point is in fact at the high end of the index (S804) such that no "next BID key" exists, a check is then made as to whether any RR attributes have been set on the End of Index (EOI) lock by a concurrent transaction (S810). In the present embodiment this indicates that an RR scan of the block index up to the end of the index is ongoing. If not, there is no concurrent RR scan, and the BID is simply inserted (S814). Otherwise, an instant lock is obtained on the EOI (S812) to ensure the RR scan is completed before the BID is inserted (S814). Operation 800 is thus completed.

The described operation constitutes an application of the known use of an RR attribute in RID indexes to BID indexes.

(1)(c) Insert RID Into Row Index

When a row is inserted into MDC table 30, the row's RID is inserted into the row index 40 as a new key. However, this RID key insert operation should not be permitted to affect the outcome of any concurrent RR scan operation that is being performed on a range of RIDs including the newly inserted RID, to ensure that the Repeatable Read operation is in fact repeatable with the same result. This is analogous to the BID key insert and block index RR scan concern addressed above in subsection (1)(b) "Insert BID into BID Index".

Figure 9:
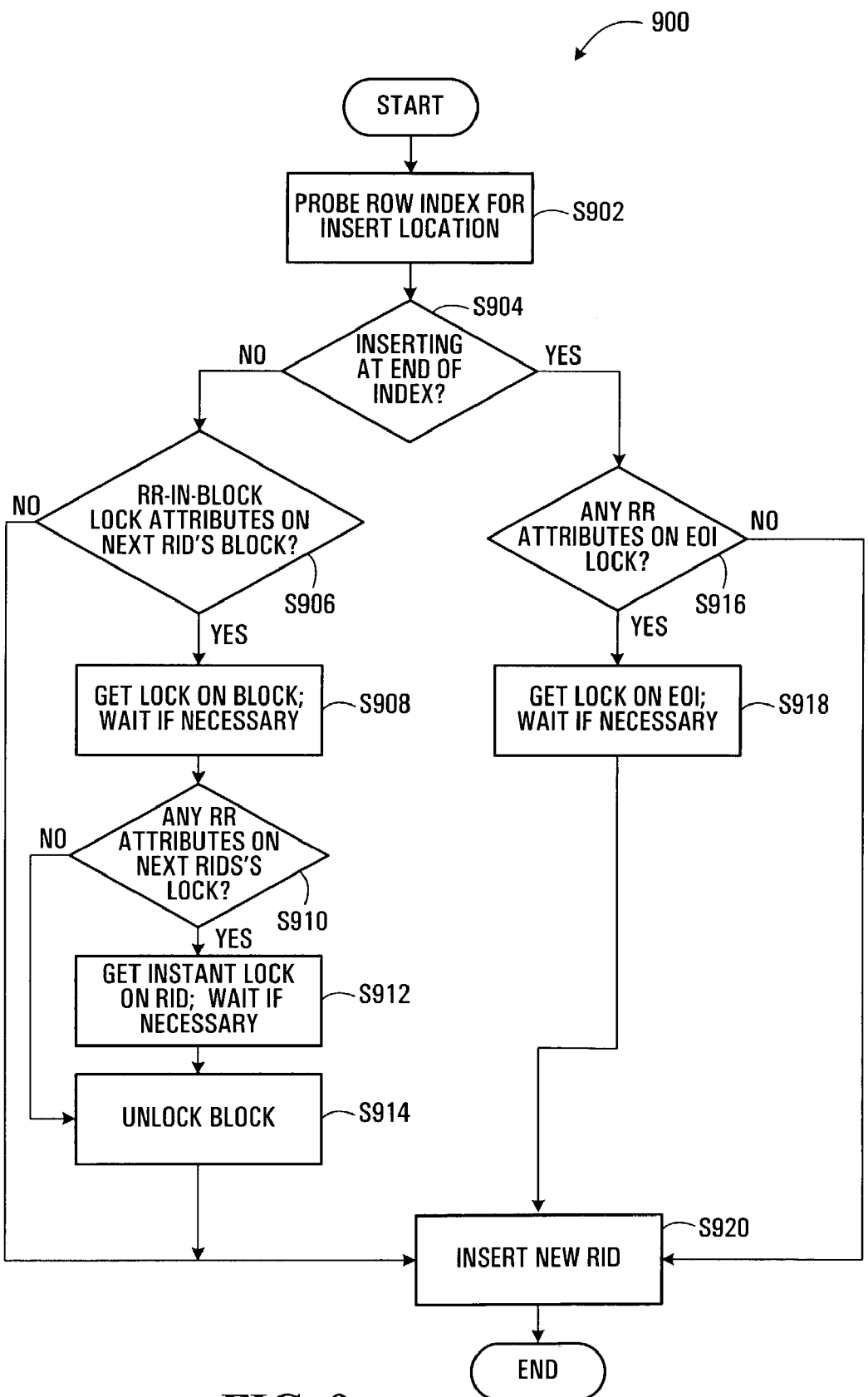
FIG. 9 is a process flow chart illustrating a method of operation for inserting a row identifier (RID) key into a row index performed by the database system of FIG. 1.

FIG. 9 illustrates operation 900 for inserting a RID into a row index that addresses this issue. The approach is essentially the same as was taken with respect to BID key inserts (see FIG. 8), except that a new attribute RR_IN_BLOCK is used to further reduce next key locking to increase concurrency. Additional steps are taken to check and lock the block of the row to be inserted, if necessary.

It should initially be appreciated that during an RR scan of a set of RIDs in the row index all of the examined RIDs are locked. Also locked is the next highest RID in the index beyond the RIDs falling within the range. This avoids the insertion of a row with a RID that is higher than the highest existing RID but still properly within the scan range, which may cause a repeated read to return spurious results.

To support the desired behavior, an RR attribute is applied to all RID locks obtained by a transaction performing an RR scan. Further, because the present locking hierarchy requires locks to be acquired at a block level before they are acquired at the row level an RR_IN_BLOCK attribute is applied to the block lock during RR scans of the row index. This avoids the unnecessary locking by an insert operation of a block containing a row identified by a row index RID when the row lock was not applied by an RR scan. This RR_IN_BLOCK indicates that at least one row within the block is locked by a process performing an RR scan and can be used during an insert to the row index to avoid next key locking where possible.

Operation 900 for inserting a RID into row index 40 is illustrated in FIG. 9. Initially, the index 40 is probed for the insert location (S902). If the insertion point is not at the end of the index (S904), it is then determined whether the RR_IN_BLOCK attribute has been set on the block of the next RID by a concurrent transaction (S906).

If this determination is made in the negative, it is known that no RR RID scanners exist in the block and no next key locking is necessary during the instant RID key insert. Next key block and row locking are thus unnecessary. Consequently, the RID is simply inserted (S920) and operation 900 completes.

If it is instead determined (in S906) that the RR_IN_BLOCK attribute has in fact been set on the block lock by a concurrent transaction, this means that an RR scan is in fact occurring on at least one row within the block associated with the row identified by the next RID beyond the row index insert point. In this case, the block is locked, waiting as necessary (S908). Because it is desired to lock the next RID in order to protect the RR row index scan from having other transactions insert into the row, a block lock is first needed so that a row lock can be obtained. If the block lock has an RR_IN_BLOCK attribute, it is known that an RR scan is in the index and some row in the block has an RR attribute on it. To determine if that row is the row that is sought to be locked, it is necessary to check if that row has an RR attribute on its lock.

Once the block lock is obtained, it is determined whether the RR lock attribute of the next RID in the row index has been set by another transaction (S910). If no RR attribute is found, it is known that no concurrent RR scan is ongoing in the relevant range. The next RID key's block is thus unlocked (S914) and the RID is inserted into the index 40 (S920), completing the operation 900.

If it is instead determined (in S910) that an RR attribute has in fact been set on the lock of the next RID by a concurrent process, an instant lock is requested on the next RID key (S912). Once this instant RID lock is obtained (ensuring any concurrent RR scan has completed), the "next" block lock is released (S914) and the RID is inserted (S920) into the row index 40, thus completing operation 900.

If it is determined (in S904) that the to-be-inserted RID may be the highest key in the row index 40 a check is made as to whether the RR attribute has been set on the End Of Index (EOI) lock by a concurrent transaction (S916). As known to those skilled in the art, the End Of Index is a logical construct that represents the next key after the last key in the index. The EOI is locked to protect an RR scan to the end of the index by preventing the insertion of a new high key that may qualify the RR scan.

If the check shows that the RR attribute has in fact been set on the EOI lock, an instant lock is obtained on the EOI lock (S918) and the RID is inserted (S920). If not, the RID is inserted (S920) without any EOI lock. Operation 900 is thus completed. No block locking is necessary when the to-be-inserted RID is to be the highest key in the row index 40. In this case the EOI is effectively the next key RID. In addition, the EOI is not actually a row, no block contains it and thus no block needs to be locked for it.

(2) Update

The reading of spurious data should be prevented when one transaction is performing an UPDATE command having dimensional predicates while there is a concurrent UR scan of the affected block or blocks by another transaction. Consider the following SQL database query:

UPDATE T1 SET PROVINCE='ON' WHERE PROVINCE='AB';

In the exemplary MDC table 30 (FIG. 3), PROVINCE is a dimensional column. Execution of this statement may effectively cause all the blocks in the 'ON' slice to be unassigned from their current cells in the 'ON' slice, and reassigned to new cells in the 'AB' slice. In the current implementation, this is accomplished by emptying the blocks in the 'ON' slice and inserting the deleted records into the 'AB' slice, possibly reusing the previously emptied blocks. It is undesirable for any concurrent UR scan to continue scanning the block during such reuse because the scan may read data that has become erroneous due to the UPDATE command changing cells to which they belong.

To address this issue, UR scans lock each scanned block IN (this is described in section (4)(a) "Table Scans" below) in addition to locking the MDC table 30 IN. Further, during execution of an UDPATE command for a block, the block lock is upgraded from X to Z when a transaction is determined to be freeing the block for possible reuse as described above. That is, if a transaction performs an UPDATE command, and on insert finds an X lock on a block that has been emptied the X lock is upgraded to a Z lock. An X lock on a block that has been emptied indicates that reuse of the block is occurring, since no other process could have emptied the block due to the X block lock. The Z lock is incompatible with every other type of lock, including the IN block lock that is applied by a UR scan. Consequently, acquisition of the Z lock ensures that no UR scanners are presently in the block or may enter the block (i.e. commence UR scanning) while the UDPATE command is being executed.

If no X lock is detected on the block, the lock is downgraded to IX after assignment of the block to the cell to allow for more concurrency. No Z lock is applied in this case.

When the transaction that reuses a block and the transaction performing a UR scan are the same transaction (versus a concurrent transaction as described above), a potential for reading spurious data still exists because it may not be known whether a block predicate has ceased to qualify during the UR scan due to block reuse. In this case, the above two-fold approach involving the setting of IN and Z locks is not suitable because a single transaction cannot conflict with its own lock.

Instead, the open cursors on the MDC table 30 are examined and a determination made as to whether any cursor is currently positioned in the block after the block has been emptied. If so, a BLOCK_DELETED flag associated with the block is set for the open cursors in the block. The BLOCK_DELETED flag is maintained in a common area and is initially cleared. Upon the next fetch, the setting of the flag is detected and as a result no further fetches are permitted in the block to avoid reading possibly changed and thus spurious data. The flag is checked before every fetch associated with the UR scan. The remainder of the block is thus skipped.

As well, a record of the block being scanned by the current cursor is stored in a shared work area, indicating the cursor's current block position in the MDC table 30. This is used in the determination above, where an open cursor detects that it is in an emptied block.

This approach is not applicable to row index scans.

That this processing applies whenever a block is freed, not only during an update of a dimension column. A transaction may execute many SQL statements before committing. Even the deletion of a single record may cause a block to be emptied and unassigned from its cell (i.e. freed). If, at some point in the future, the transaction inserts a record that requires a block to be assigned to a cell which does not yet exist or is full, the previously emptied block may be reused. UR scan protection applies to such situations as well. Moreover, a benefit is provided to other scans in that a quick exit is provided from blocks that no longer require processing because they are empty.

(3) Delete

As is well understood by those skilled in the art, delete operations often inherently entail a scan operation, e.g. when delete commands have predicates necessitating a search for qualifying records to be deleted. The type of scan (table scan, block index scan, row index scan) that should be performed (which is typically determined by the optimizer) may vary depending upon the type of predicate. For example:

If a DELETE * (i.e. delete all) command is received, or if it is determined that most of the MCD table 30 may be deleted (as may be determined through statistics gathered on data, table, indexes, cardinalities, etc.), a table scan should be performed.

If a command having a DELETE WHERE predicate for a dimension of the MDC table 30 is received, a scan of the associated dimension block index may be performed to identify the blocks qualifying the predicate (i.e. meeting the condition of the predicate following "WHERE").

If a command having a DELETE WHERE predicate specifying more than one dimension is received, scans of each relevant dimension block index should be performed and the results combined (ANDed or ORed, as appropriate). In this case, deferred fetch may be performed on the ultimately matching set of blocks. Alternatively, in the event that the predicate specifies a cell to be deleted, a scan of the composite block index may be performed. If there are only block level predicates to be applied, a direct fetch of each block may be performed.

If a command having a DELETE WHERE predicate specifying columns involving columns in the row index, a row index scan may be chosen to identify qualifying rows.

Scan operations are described in Section (4) "Scan" herein.

When a RID key has been pseudo-deleted (e.g. upon deletion of a row), it is desirable to minimize the number of locks required to determine if the pseudo-deleted RID is actually committed or not. Consequently, CS and RS row index scans may determine whether the RID may safely be skipped (if the delete has committed) or whether a lock should be acquired for the RID (if the delete is still capable of being rolled back). This consideration is not relevant to RR scans as RR scans lock all RIDs encountered even if pseudo-deleted to prevent the deleter from rolling back and inserting values into the RR scan. In the case of UR scans, it is permissible to return uncommitted results (not the case for CS and RS scans).

CS and RS scanners achieve this by making their RID key lock request with the condition to only wait on the lock if a concurrent transaction (not the present one) has pseudo-deleted the RID key. To support this, when a row is deleted, a DELETE attribute is obtained on the row's lock. This is illustrated in FIG. 10.

Figure 10:
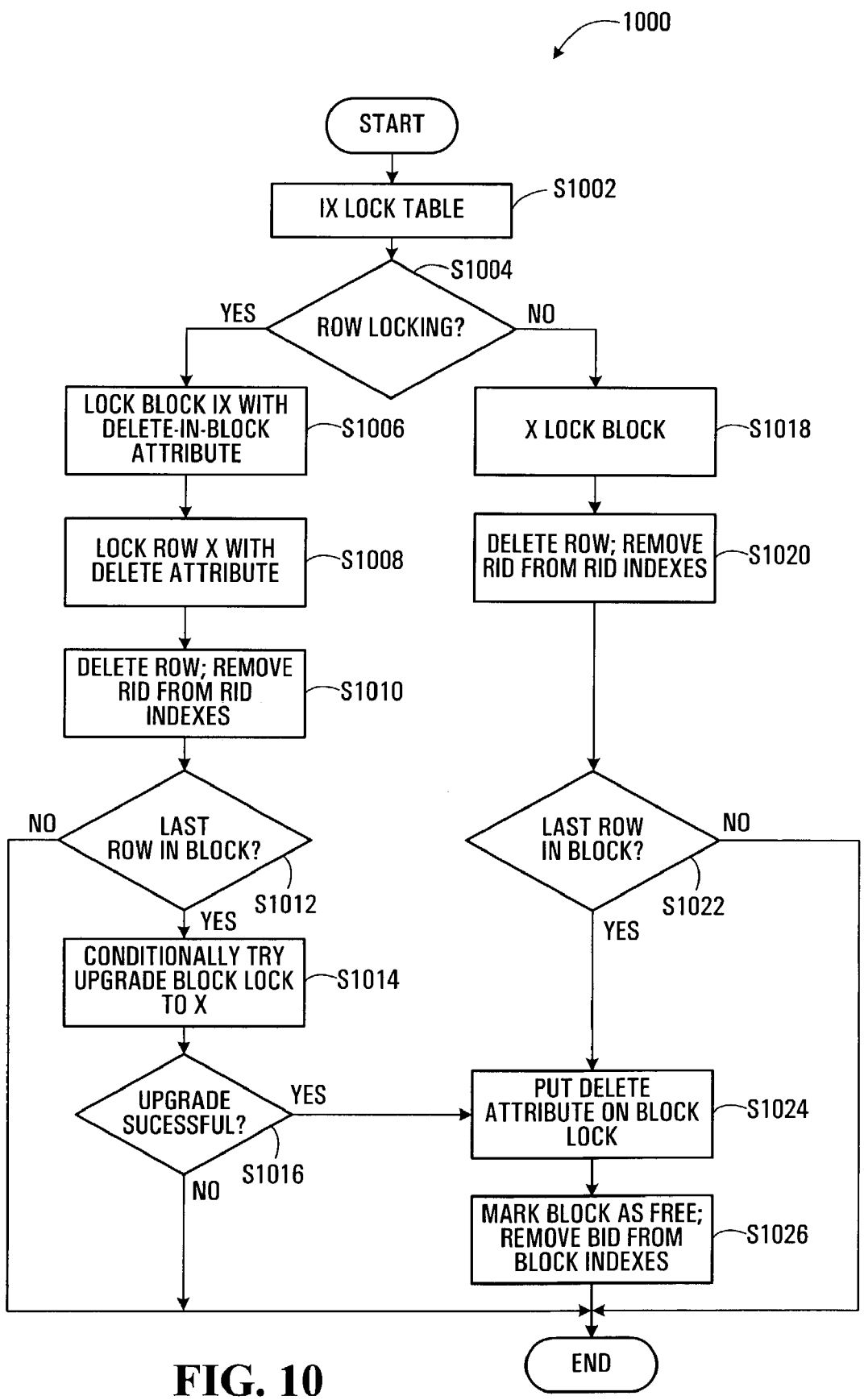
FIG. 10 is a process flow chart illustrating a method of operation for deleting a database row performed by the database system of FIG. 1.

FIG. 10 illustrates operation 1000 for deleting a row from the MDC table 30. Initially, an IX lock is obtained on the MDC table 30 (S1002). Row locking is performed by default. However, when the delete statement has a dimension predicate that may cause the deletion of most or all rows in a block, a stronger X lock is obtained at the block level (rather than an IX lock), and no locks of any kind (rather than X locks) are obtained for the individual rows within the block. The X block lock ensures that other processes are locked out during the delete operation despite the absence of any row locks; the absence of row locks reduces locking overhead Other "delete" cases in which row locking is not performed comprise situations where the MCD table 30 has been escalated or when the user has explicitly X locked the MDC table 30 so no row or block locking is performed (except for the Z block locking during insert where necessary).

If it is determined that row locking is to be performed (S1004), the block in which the to-be-deleted row resides is determined (e.g. mathematically) and locked IX. The DELETE_IN_BLOCK attribute of the lock is set to indicate that a row within the block is to be deleted (S1006).

Next, the to-be-deleted row is locked X, and the DELETE attribute of the row lock is set (S1008). The row is then deleted and its row ID is pseudo-deleted from any row indexes (e.g. row index 40) listing that row (S1010). The pseudo-deletion is committed when the transaction commits but the pseudo-deleted RID may not be physically removed at that time. If the resultant block still contains at least one row (S1012), operation 1000 completes. If the resultant block is empty (S1012), the IX lock on the block is conditionally upgraded to X (S1014) to reflect the intention to free the block and pseudo-delete its BID from the block indexes. If the X lock is not successfully acquired (S1016), operation 1000 completes. This promotes greater concurrency by reducing the likelihood of deadlock. Deadlock may be especially likely if the instant transaction waits on this lock since the normal protocol is to lock in order of coarse to fine granularity (table, block, then row), whereas in this case an upgraded block lock is being sought after the row lock is already in place. The consequence of abandoning the block deletion is that empty blocks may be pointed to by block indexes and thus assigned to cells. However, conditional upgrading of locks is not required; the transaction could simply wait.

If the X lock is in fact successfully acquired on the block (S1016), the DELETE attribute of the block's X lock is set (S1024). So that the block may be later reused if necessary, the empty block is thereafter disassociated from the cell. Disassociation is achieved by setting the status of this block to "free" within the block map and by pseudo-deleting the block's ID in the dimension block indexes 60, 80 and the composite block index 100 (S1026). Operation 1000 is thus completed.

If it is instead determined (in S1004) that row locking is not to be performed, the block is locked X (S1018). Thereafter the row is deleted and its RID removed from any RID indexes (S1020). If the block still contains at least one row (S1022), operation 1000 completes. If the block is now empty (S1022), operation proceeds with S1024 and S1026 to completion (as described above).

The corresponding CS and RS row index scan operation that relies on the effect of the delete operation of FIG. 10 is described in subsection (4)(c) "Row Index Scan" below.

The approach illustrated in FIG. 10 for marking RIDs as pseudo-deleted in the row index 40 is also used to mark BIDs as pseudo-deleted in a dimension block index 60, 80 or composite block index 100. This permits CS and RS block index scans to check whether pseudo-deleted BIDs have been committed by checking whether the block has been locked with the DELETE attribute by a concurrent transaction and by waiting on the lock only in cases when this is found to be true (indicating uncommittedness). This block index scan operation is described in section (4)(b) "Block Index Scan" below.

As described in the previous section, for cursored operations, a BLOCK_DELETED flag is set in a shared area if it is determined that a cursor is currently positioned in the block that is being emptied.

(4) Scan

These types of scans exemplify scans that may occur in the present embodiment: table scans, block index scans and row index scans. A table scan (or "relational scan") is a scan of all the rows in the MDC table 30. A scan of a subset of the table's rows is referred to as a "mini-relational scan". A block index scan is a scan of a dimension block index (e.g. dimension block indexes 60, 80) or a composite block index and may be limited to a range of BIDs within the scanned index. A row index scan is analogous to a block index scan except it is performed within the row index 40 with respect to RIDs not BIDs. The use of a cursor is possible but not assumed for these scan types. These scans are described in the subsections that follow.

(4)(a) Table Scan

As indicated previously, locking is performed in hierarchical order of coarser to finer granularity, namely table, block, then row. This reduces deadlocks that might otherwise occur if concurrent transactions were to perform locking in an inconsistent hierarchical order. For example, a transaction utilizing coarser-to-finer granularity locking could deadlock with a concurrent transaction utilizing finer-to-coarser granularity if they are both attempting to lock the same set of objects.

If any level (table, block, or row) is locked, the levels above it are locked as well, but not all levels of the hierarchy of MDC table 30 are necessarily locked. To reduce lock overhead, a stronger lock may be acquired at a higher level (i.e. for a unit of data of coarser granularity) when it is known that the entire next lower level (i.e. all the units of data of finer granularity comprising the unit of data of coarser granularity) or a majority of that level would have otherwise been locked.

For example, when a CS or RS table scan for searched update has predicates only on dimension values, the MDC table 30 is locked IX, then each block is locked U when it is reached. No row locking is performed. When the dimension predicates for the block are evaluated, if it is determined that the block does not qualify, the block need not be searched nor row locks obtained because it is known that none of the rows may qualify and the U lock is released. If the block does qualify the dimension predicates, it is known that every row in the block qualifies the predicates so the lock can be upgraded to X and the block processed without necessitating an X lock on every row. This reduces the number of locks needed to process this statement while not significantly impacting concurrency, assuming that a majority of rows would otherwise be locked RR scans lock at the block level and do not perform record locking. UR scans do not perform row locking but perform IN locking at the table and block levels for table and block index scans and perform IN locking only at the table level for record index scans.

When an RS scan is performed, locks are maintained only on data objects that qualify predicates. In contrast, RR scans maintain locks on all data objects, CS scans maintain locks on no data objects, and UR scans do not acquire row locks or maintain block locks. A block lock is maintained until commit only when one or more rows within the block qualifies predicates, even in the case where block locking is being performed and row locking is not. If no rows in the block qualify predicates, no block lock is held until commit.

To achieve this behavior, the present embodiment employs lock durations during MDC table 30, block and row index scans. A lock duration is a degree of locking, i.e. a number of locks applied to a particular object. For example, a lock having a duration of two for a particular transaction has been locked twice. Such a lock should be unlocked twice in order to be "fully unlocked", i.e. released by this transaction. To effectively add another lock to an object, the present embodiment employs an efficient approach whereby the relevant lock duration is simply incremented. The lock duration is implemented such that it is shared by transactions. A lock duration may be decremented by a transaction such that the current transaction no longer holds the lock, but the duration is still more than zero since other transactions have the object locked. Only when the duration is zero is it completely unlocked.

The incrementing of lock durations is used to keep a block locked when a scan moves off the block leaving one or more locked rows in the block. During a table scan, encountering a block causes the block to be locked; i.e. the duration of the block lock is incremented. Thereafter, when a qualifying row is found within the block, the block lock duration is again incremented. To avoid undue lock overhead in the event that many rows qualify within the block, only the first qualifying row results in a block lock duration increase. This is achieved by way of a READ_BLOCK_KEPT flag that is initially cleared when a new block is encountered and set when a first qualifying row is found.

Using this approach, a block containing one or more qualifying rows may remain locked when a scan's cursor moves off the block, regardless of whether the scan unlocks the block lock. Typically, though, the scan unlocks the block lock when moving off the block. If the scan unlocks the block as it moves off the block, it may decrement the duration only once, as usual. The incremented block lock duration, performed when row predicates are satisfied, may ensure that the block remains locked. The cursor may thus concern itself only with block predicates and not with row predicates as it moves from block to block. That is, the cursor may routinely lock a newly encountered block (once) and then routinely unlock it (also once) upon leaving the block.

Figure 11:
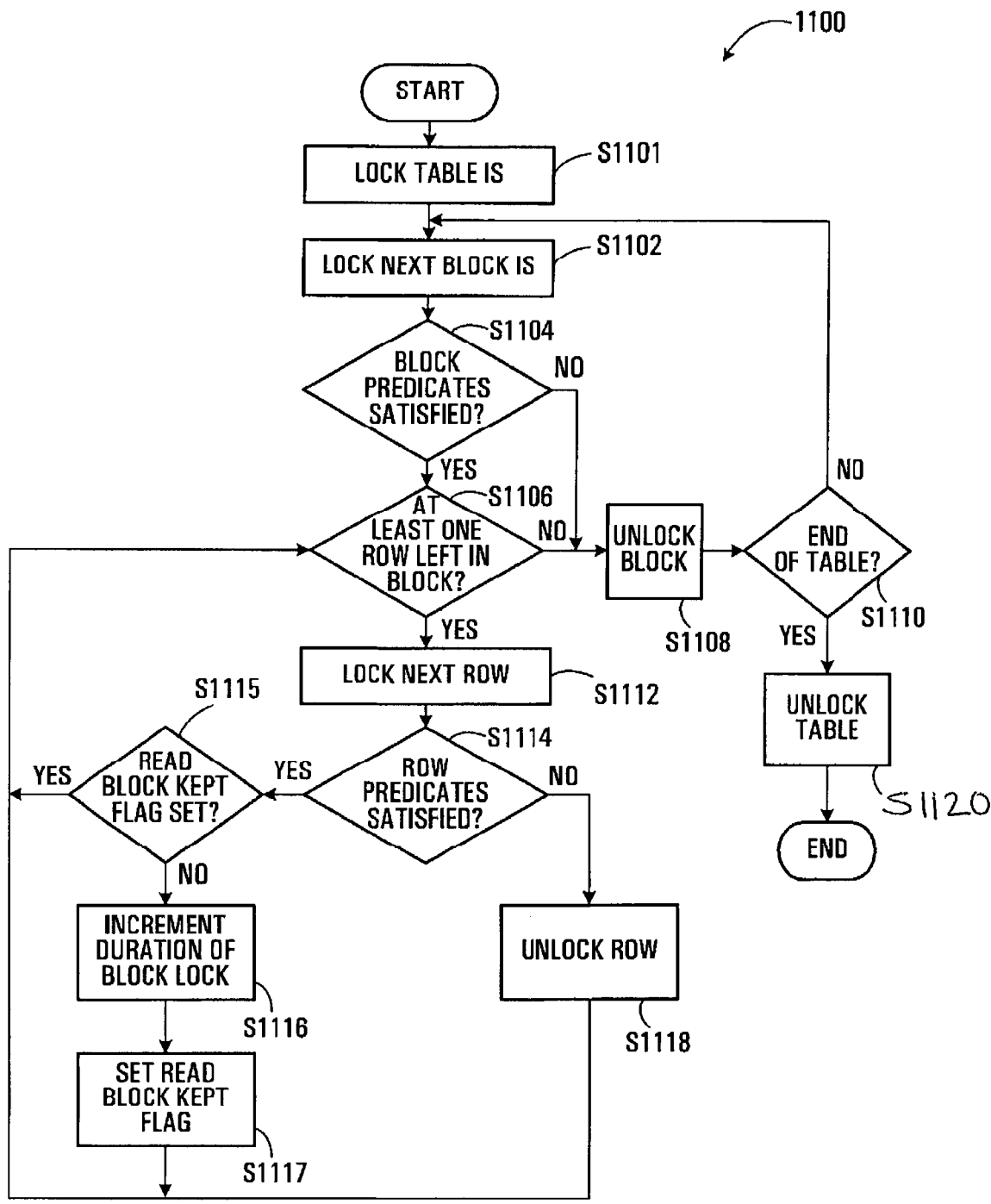
FIG. 11 is a process flow chart illustrating a method of operation for an exemplary table scan with isolation level Read Stability (RS) performed by the database system of FIG. 1.

This is illustrated in FIG. 11, which shows operation 1100 for scanning an MDC table 30 with isolation level RS. The MDC table 30 is initially locked IS (S1101). As a block is scanned it is locked IS (S1102). If the scan has any dimension predicates, it is determined whether the current block satisfies them (S1104). If predicates are satisfied or there aren't any block predicates, and it is determined that the block contains at least one row (S1106), the block is scanned, with each row in the block being locked (shared lock) prior to being scanned (S1112). If row predicates exist, it is determined whether the row qualifies (S1114), i.e. the row satisfies the row predicates. If not, the row is unlocked (S1118) and the scan of the block's rows continues (S1106). If the row predicates do qualify, or no row predicates exist, the READ_BLOCK_KEPT flag is checked (S1115). If the flag is set, it is known that at least one row has previously been found to qualify, the block lock has already been incremented. Consequently, the scan of the block continues (S1106). If the flag is not set, it is known that no row has previously been found to qualify. In this case, the duration of the block lock is incremented (S1116), the READ_BLOCK_KEPT flag is set (S1117), and the row remains locked as the scan of the block continues (S1106).

Rows are processed in this manner until the end of the block is reached at which time the block is "unlocked"; i.e., its lock duration is decreased by one (S1108). Notably, if any row in the block qualified predicates (or effectively qualified because no predicates exist) the block may remain locked even after it is "unlocked" in S1108 to reflect that fact.

Further blocks in the MDC table 30 are processed similarly. If a block fails to qualify the block predicates (S1104), or the block qualifies block predicates but contains no qualifying rows (S1106), the block is unlocked (in this case fully, i.e. lock duration for this scan becomes zero) (S1108). The scan continues until the end of the MDC table 30 is reached (S1110). The table lock IS placed in S1101 at the beginning of operation 1100 is then removed (S1120) and operation 1100 is complete.

For all isolation levels, the same mechanism of incrementing the block lock duration as described above with respect to RS scanning is used to maintain the block lock if any rows within the block are deleted or updated by the same transaction. Again, a similar WRITE_BLOCK_KEPT flag may be used to indicate that this has been performed so that only one block lock duration increment occurs regardless of the number of deleted/updated rows in the block.

Figure 12:
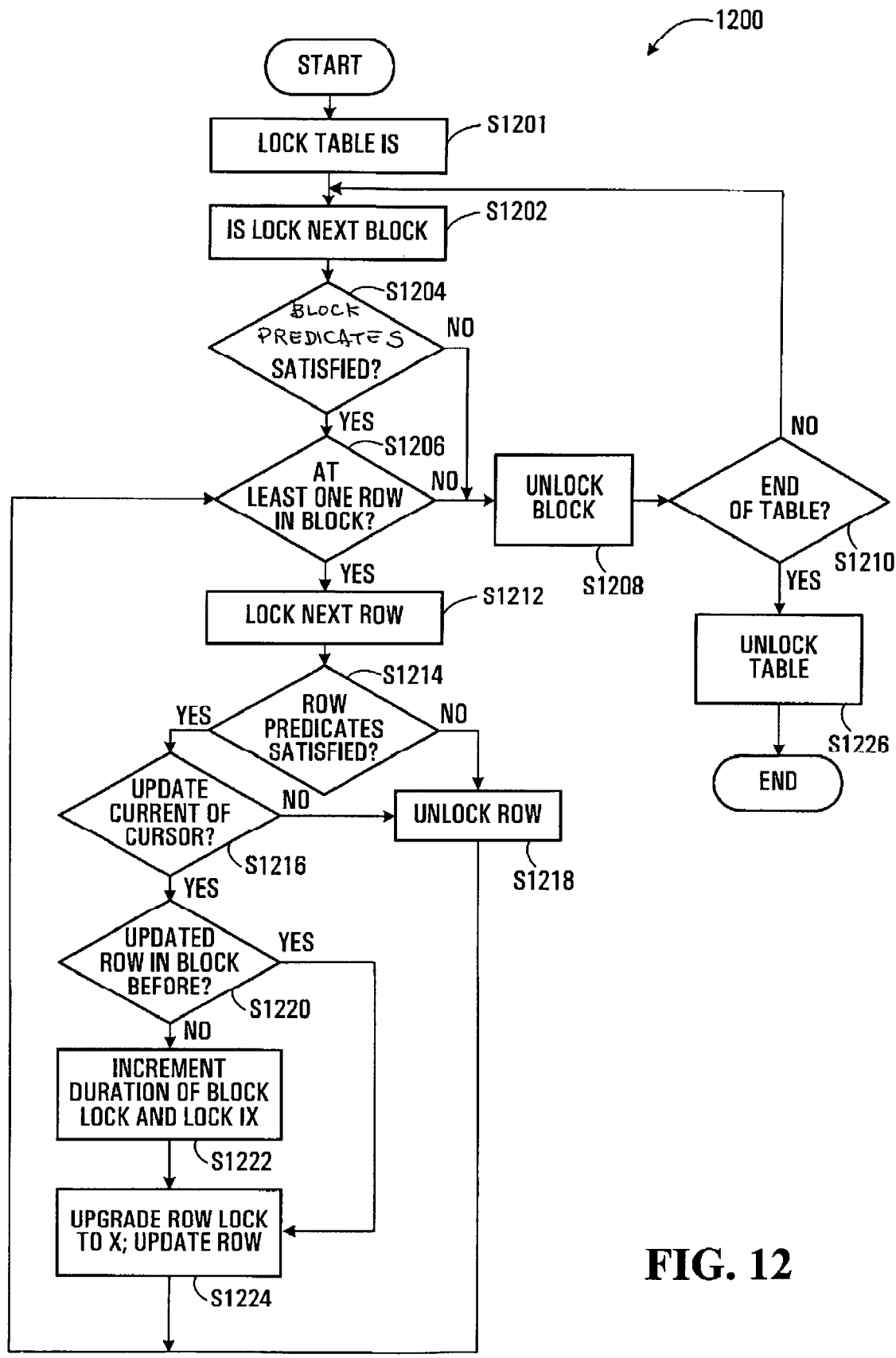
FIG. 12 is a process flow chart illustrating a method of operation for an exemplary table scan with isolation level Cursor Stability (CS) performed by the database system of FIG. 1.

This is illustrated in FIG. 12, which shows an exemplary table scan operation 1200 with isolation level CS. This particular table scan is the result of an UPDATE WHERE CURRENT OF database command; this command modifies a single row pointed to by the cursor after it has been fetched. The MDC table 30 is initially locked IS (S1201). As a block is scanned it is locked IS (S1202). If any dimension predicates exist, it is determined whether the current block satisfies them (S1204). If predicates are satisfied or no block predicates exist, and it is determined that the block contains at least one row (S1206), the block is scanned, with each row in the block being share or update (U) locked as it is scanned (S1212). If row predicates exist, it is determined whether if the row qualifies (S1214), i.e. the row satisfies the predicates. If not, the row is unlocked (S1218) and the scan of the block's rows continues (S1206). Otherwise, if an UPDATE WHERE CURRENT OF is issued on this cursor's position (S1216), a determination is next made as to whether a row in this block has previously been updated during this block scan (S1220). If it is determined that a row has in fact been updated during this block scan (as may be determined by checking whether the WRITE_BLOCK_LOCK flag has been set), it is known that the block lock duration has already been incremented. Consequently, the row lock is simply upgraded to X and the row is updated (S1224), and the scan continues (S1206). Otherwise the block lock duration is incremented and the block lock is upgraded from IS to IX (S1222). The row lock is then upgraded and the row updated (S1224). The WRITE_BLOCK_LOCK flag is set if not already set, indicating that row has been updated.

Rows are processed in this manner until the end of the block is reached (determined at S1206), at which time the block is unlocked by decreasing its duration by one (S1208). Further blocks in the MDC table 30 are processed similarly. If a block fails to qualify the block predicates (S1204), or no rows are contained in the block though the block predicates are satisfied (S1206), the block is unlocked (S1208) by the scan, and the scan continues until the end of the MDC table 30 is reached (S1210). The table lock IS placed in S1201 at the beginning of operation 1200 is then removed (S1226) and operation 1200 is complete.

In the remainder of this description, a block lock is described as being "released" when it is not protected by an increment in duration, and remains locked otherwise.

As mentioned previously, in the case of UR scans, an IN lock is applied both at the table level and at the block level. In conjunction with the Z lock upgrade performed by transactions resulting in block reuse (described above in Section (3) "Delete"), the IN block-level lock avoids spurious UR scan results upon the occurrence of concurrent block delete/update operations. These concurrent block delete/update operations are triggered by queries having dimensional predicates that cause the deletion of one or more blocks from one cell and the reinsertion these blocks into another cell.

The MDC table 30 and further subsections that follow summarize the type of locks applied at each of the three levels of granularity of the present embodiment during a table scan for various predicate scenarios. With respect to Table 3, each table entry comprises these parts: table lock/block lock/record (i.e. row) lock. A dash ("—") indicates an absence of any lock at the indicated level. The "Cursored Operation/Scan" column heading/subheading is understood to apply to scans that are cursor controlled. The "Cursored Operation/Where Current Of" column applies to the subsequent access to the data with an UPDATE WHERE CURRENT OF CURSOR or DELETE WHERE CURRENT OF CURSOR clause. The "Scan" subheading of the "Searched Update or Delete" column pertains to scans that involve a DELETE WHERE clause; the "Delete/Update Where" subheading of that column pertains to scans that involve an UDPATE WHERE clause. In the table row headings, the "With Predicates" row is understood to apply to sargs (i.e. predicates that are capable of being evaluated by examining an index) and/or resids (i.e., predicates that cannot be evaluated by examining an index). It may be appreciated that in any transaction where a table lock is applied, the table lock is held throughout the transaction.

TABLE 3

Locks Applied During Table Scan

| Access Method | Isolation Level | Read Only Scans | Cursored Operation | | Searched Update Or Delete | |
|---|---|---|---|---|---|---|
| | | | Scan | Where Current Of | Scan | Delete/ Update Where |
| No Predicates | RR | S/—/— | U/—/— | SIX/IX/X | X/—/— | X/—/— |
| | RS | IS/IS/NS | IX/IX/U | IX/IX/X | IX/X/— | IX/X/— |

TABLE 3-continued

Locks Applied During Table Scan

| Access Method | Isolation Level | Read Only Scans | Cursored Operation | | Searched Update Or Delete | |
|---|---|---|---|---|---|---|
| | | | Scan | Where Current Of | Scan | Delete/ Update Where |
| | CS | IS/IS/NS | IX/IX/U | IX/IX/X | IX/X/— | IX/X/— |
| | UR | IN/IN/— | IX/IX/U | IX/IX/X | IX/X/— | IX/X/— |
| Predicates | RR | S/—/— | U/—/— | SIX/IX/X | U/—/— | SIX/X/— |
| on | RS | IS/IS/NS | IX/IX/U | IX/IX/X | IX/U/— | IX/X/— |
| Dimension Columns | CS | IS/IS/NS | IX/IX/U | IX/IX/X | IX/U/— | IX/X/— |
| Only | UR | IN/IN/— | IX/IX/U | IX/IX/X | IX/U/— | IX/X/— |
| Non-Dimensional | RR | S/—/— | U/—/— | SIX/IX/X | U/—/— | SIX/IX/X |
| Predicates | RS | IS/IS/NS | IX/IX/U | IX/IX/X | IX/X/U | IX/IX/X |
| | CS | IS/IS/NS | IX/IX/U | IX/IX/X | IX/X/U | IX/IX/X |
| | UR | IN/IN/— | IX/IX/U | IX/IX/X | IX/X/U | IX/IX/X |

In the subsections that follow, the categories of scans that mirror the primary columns of Table 3 (i.e. "Read Only Scans", "Cursored Operation", and "Search Update Or Delete") are described.

(4)(a)(i) Read Only Table Scans

As can be seen in Table 3, RR scans lock the table S but do not lock at the block and row levels, as the S table lock is sufficient to prevent Insert/Update/Delete ("I/U/D") activity in the MDC table 30. Locking for the remaining isolation levels is shown in Table 3.

(4)(a)(ii) Cursored Operation Table Scans

For RR scans, the MDC table 30 is U locked during the initial scan to prevent I/U/D activity in the MDC table 30. Also for RR scans, when a command with a WHERE CURRENT OF CURSOR clause is executed (e.g. update or delete), the table lock is upgraded to SIX, the block is locked IX and the row at which the cursor is positioned is locked X. This allows significant concurrency in the rest of the MDC table 30 (read only) while individual rows are accessed with the cursor. In the case of a WHERE CURRENT OF command with no predicates or dimension predicates only, an IX (rather than X) block lock is applied to allow scanners in the block during processing of the block's rows to promote concurrency.

For CS, RS and UR scans, the MDC table 30 is IX locked, as is the current block, and rows are locked U, during the initial scan. When the positioned command is performed, predicates are evaluated (if any) and the row lock is upgraded to an X lock if the row qualifies. Otherwise, the row lock is released. If no rows in a block qualify, the block lock is released as well.

(4)(a)(iii) Searched Update and Delete Table Scans

For RR scans with no predicates, the MDC table 30 is simply locked X since all rows may be deleted or updated, and locks held.

For RR scans with dimension or other predicates, the MDC table 30 is initially locked U. This U lock is upgraded to SIX if blocks/rows are found to qualify, reducing risk of deadlock.

For RR scans with dimension predicates only, block predicate qualification can be determined by checking the predicates against a single row of the block. The block is initially locked U until the predicates are evaluated. If the block qualifies, the table lock is upgraded to SIX in order to continue to allow scanners but not I/U/D activity in the MDC table 30. The block is then locked X, as it is known that all the rows in the block are affected. Each row is then processed. No row locking is required as the X block lock prevents access to the block.

For RR scans with non-dimensional predicates, the MDC table 30 is initially locked U. With this U table lock, rows can be checked for qualification of predicates. Upon detection of a qualifying row, the U table lock is upgraded to SIX and the relevant block is locked IX. The row can then be locked X and processed. Thereafter, the block need not be locked again if/when other qualifying rows are found within it.

For CS, RS and UR scans having no predicates, the MDC table 30 is locked IX and each block is locked X as it is encountered. Row locking is unnecessary as the X block lock prevents concurrent access to the block. Despite the fact that all of the rows of MDC table 30 may be updated or deleted (as no predicates are applied), the MDC table 30 is not locked X. Rather, the MDC table 30 is locked IX and blocks are locked X to permit some concurrent access to the MDC table 30. The X block lock ensures that an emptied block can be freed from the MDC table 30.

For CS, RS and UR scans having dimension predicates only, the MDC table 30 is locked IX and each block is locked U as it is encountered. If a single row in the block qualifies, then the block lock is upgraded to X since all rows in the block may then also qualify. Row locking is not necessary as the X block lock prevents concurrent access to the block. If the first row in the block does not qualify, the block can safely be skipped and unlocked.

For CS, RS and UR scans having non-dimensional predicates, the MDC table 30 and block are locked IX. Since individual rows may or may not qualify, rows are initially locked U and only upgraded to an X lock if they qualify.

(4)(b) Block Index Scan

In overview, a block index scan (of a dimension block index 60, 80 or of the composite block index 100) locks the MDC table 30 and then locks each block as it is encountered in the index. For each block of the index that qualifies the scan, a scan applying predicates (if any exist) is performed on the current block in the MDC table 30. Row locks within a block are obtained as the block is scanned if row locking is being performed. Row locking is not performed if all of the rows of a block would have to be locked in any event (as described above).

If a database query has only block predicates (i.e. predicates on columns which are dimensions in the MDC table 30) and an RR read only scan is being performed, then only S block level locking is performed without any row locking. Similarly, if a CS, RS or UR scan for searched update is being performed and there are no predicates or only block predicates, only U or X block level locking is performed.

As described in subsection (1)(b) "Insert BID Into Block Index", in the case of an RR scan of a block index, an RR attribute is set on each scanned block so that S block locks of RR scans can be distinguished from S block locks of other types of scans. Consequently, BID insert transactions potentially affecting the outcome of a concurrent RR block scan can detect the concurrent RR scan and wait for its completion prior to inserting the BID of a new block into the block index.

Figure 13:
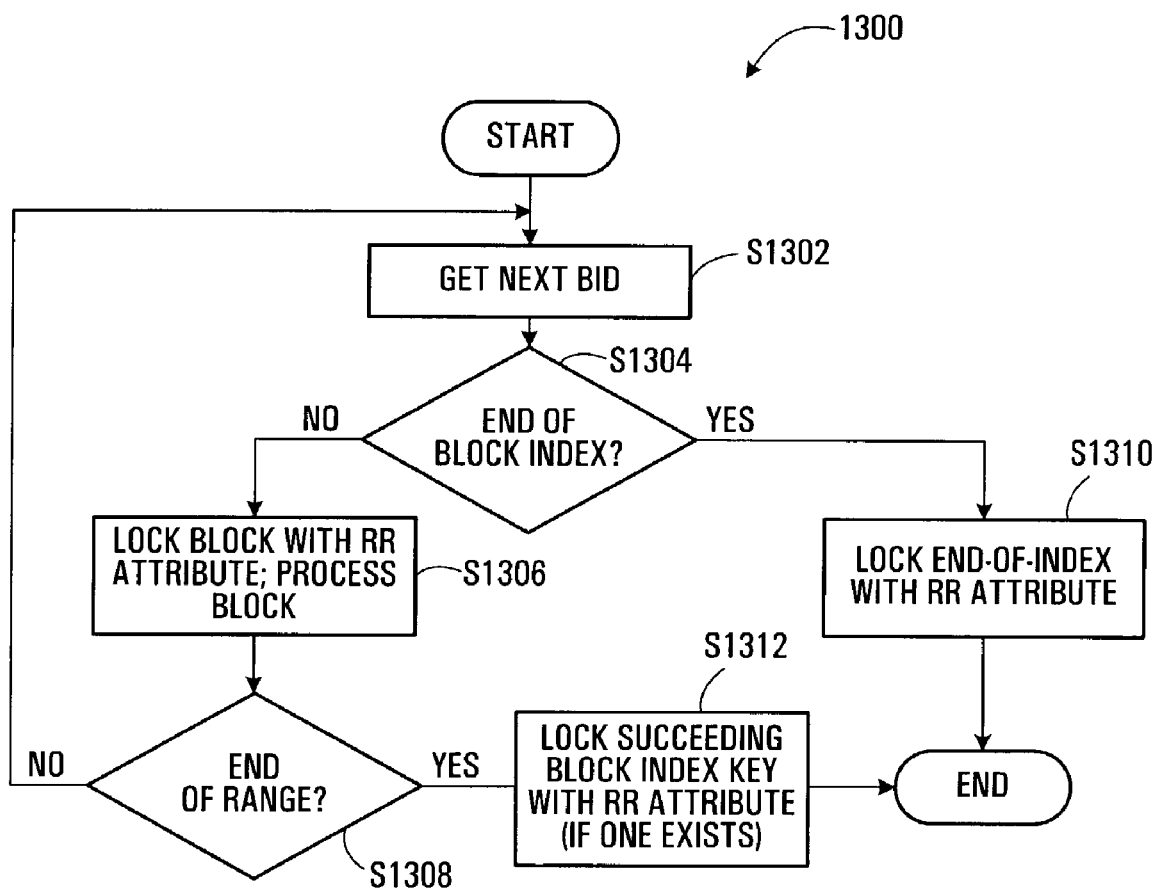
FIG. 13 is a process flow chart illustrating a method of operation for a Repeatable Read (RR) scan of a block index performed by the database system of FIG. 1.

FIG. 13 illustrates operation 1300 for a block index RR scan. The BIDs of the index (which may be dimension block index 60 or 80 or composite block index 100 in the present embodiment) are accessed in turn (S1302) until the end of the block index is reached (S1304). For each accessed BID, before the block is processed the block is locked and the RR attribute is set for the lock, indicating that this block lock has been applied by an RR scan transaction (S1306). The type of lock applied is dependent on the isolation level RR, RS, CS, and UR (see Table 4 below). If the end of the scan range is reached (S1308), the block index key immediately succeeding the highest key in the RR scan range is locked with the RR attribute being set (S1312). Operation 1300 then completes. Otherwise, if the end of the scan range is not reached (S1308) processing returns to S1302. If the end of the index is reached (S1304), the End Of Index is locked with an RR attribute (S1310) and operation 1300 completes.

As indicated above in Section (3), "Delete", CS and RS block index scans check whether pseudo-deleted BIDs have been committed by checking whether the block has been locked by a concurrent transaction that has applied the DELETE attribute to the block lock. The CS and RS block index only waits for a BID in cases when this is found to be true (indicating "uncommittedness"). This is illustrated in FIG. 14.

Figure 14:
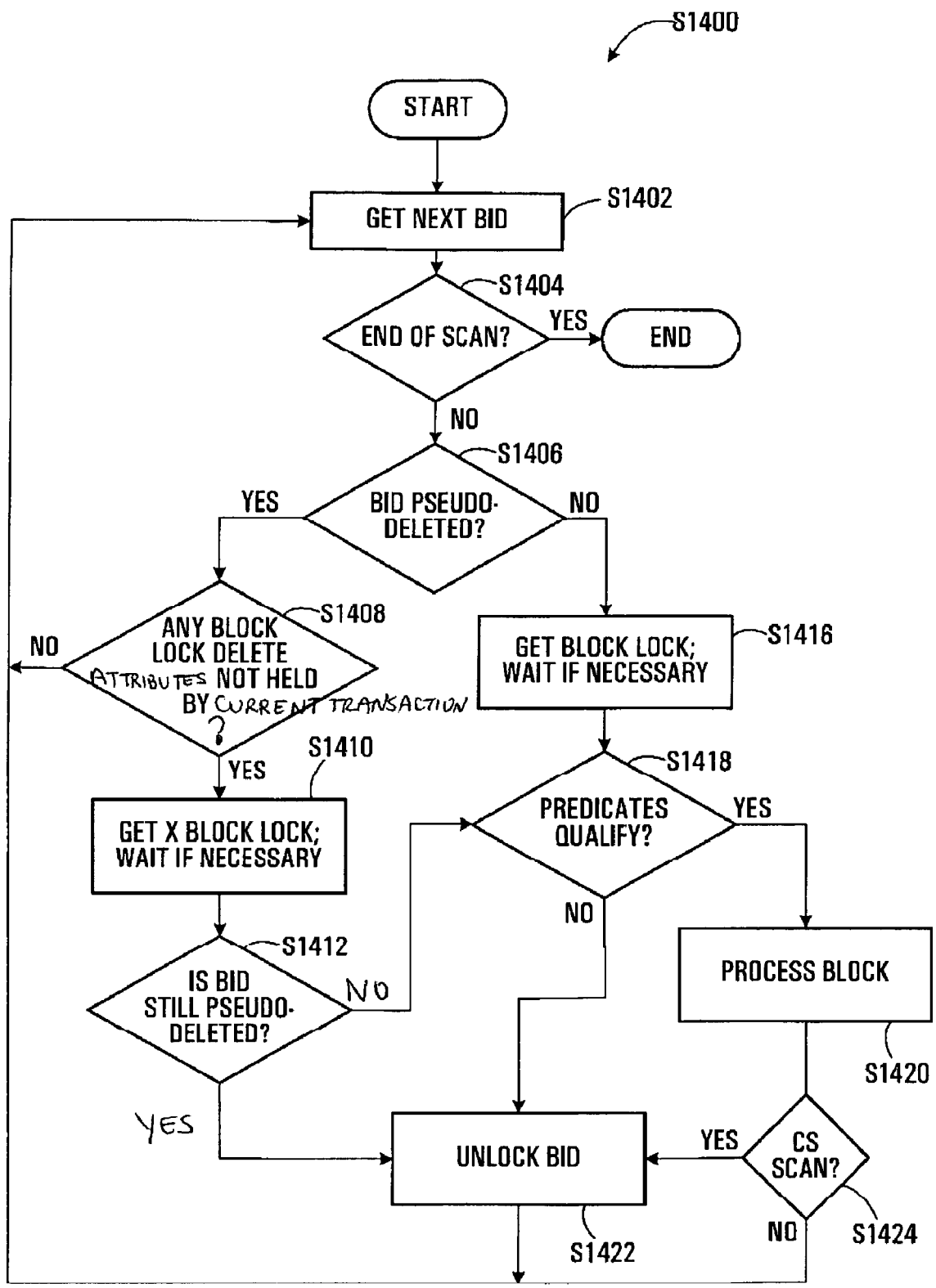
FIG. 14 is a process flow chart illustrating a method of operation for a CS or RS scan of a block index performed by the database system of FIG. 1.

FIG. 14 illustrates operation 1400 of a CS or RS block index scan. BIDs in the index are accessed in turn (S1402) until the end of the scan is reached (S1404), i.e. until EOI or the end of range is reached. If an accessed BID is found to be pseudo-deleted (S1406), a check is made as to whether a DELETE attribute has been set on the corresponding block's lock by a concurrent transaction (S1408). If it is not a concurrent process that has pseudo-deleted the block, the current BID is skipped and the next BID is accessed (S1402). The BID is skipped because it may be deduced that the current transaction has pseudo-deleted the block. Consequently, it is assumed committed to this point (upon rollback it may be rolled back). Otherwise the transaction is uncommitted or the lock would be released as commit processing unlocks all locks acquired by the transaction.

If it is a concurrent process that has pseudo-deleted the block, a block lock is obtained on the block, waiting on the lock as necessary (S1410). Thereafter, if the BID is still pseudo-deleted as would occur if the concurrent delete transaction has been committed (S1412), the block is unlocked (S1422) since it is not proper to include the deleted BID in the results of this scan, and the next BID accessed (S1402).

If the BID is no longer pseudo-deleted (e.g., if the concurrent delete transaction has been rolled back), a check is made as to whether predicates qualify (S1418). If they do not, the BID is unlocked (S1422) and the next BID is accessed (S1402). It may be appreciated that, in the present description, references to locking/unlocking a BID (or RID) should be understood to be synonymous with locking/unlocking a block (or row). If predicates do qualify (or there are no predicates), the block is processed (S1420). Processing in this case refers to performing whatever operations are required for each encountered qualifying row: in some cases there are other predicates to be evaluated by a runtime interpreter; rows may be output to the user; rows may be put into a sort or combined with others in join operations or counted; or other steps may be taken, depending on the SQL and access plan. If the scan is a CS scan (S1424), the BID is unlocked, otherwise the lock is maintained. The next BID is then accessed (S1402).

If the accessed BID is not found to be pseudo-deleted (S1406), a block lock is obtained, waiting as necessary (S1416). Operation then continues at S1418, as described above.

Table 4 summarizes the type of locks applied at each of the levels of granularity of the present embodiment during a block index scan for various predicate scenarios. Table 4 follows the conventions of Table 3 above.

TABLE 4

Locks Applied During Block Index Scans

| Access Method | Isolation Level | Read Only Scans | Cursored Operation Scan | Cursored Operation Where Current Of | Searched Update Or Delete Scan/Delete | Searched Update Or Delete Scan/Update |
|---|---|---|---|---|---|---|
| No Predicates | RR | S/—/— | IX/IX/S | IX/IX/X | X/—/— | X/—/— |
|  | RS | IS/IS/NS | IX/IX/U | IX/IX/X | IX/X/— | IX/X/— |
|  | CS | IS/IS/NS | IX/IX/U | IX/IX/X | IX/X/— | IX/X/— |
|  | UR | IN/IN/— | IX/IX/U | IX/IX/X | IX/X/— | IX/X/— |
| Predicates on Dimension Columns Only | RR | IS/S/— | IX/IX/S | IX/IX/X | IX/U/— | IX/X/— |
|  | RS | IS/IS/NS | IX/IX/U | IX/IX/X | IX/U/— | IX/X/— |
|  | CS | IS/IS/NS | IX/IX/U | IX/IX/X | IX/U/— | IX/X/— |
|  | UR | IN/IN/— | IX/IX/U | IX/IX/X | IX/U/— | IX/X/— |
| Dimension Start and Stop Predicates Only | RR | IS/S/— | IX/IX/S | IX/IX/X | IX/X/— | IX/X/— |
|  | RS | IS/IS/NS | IX/IX/U | IX/IX/X | IX/X/— | IX/X/— |
|  | CS | IS/IS/NS | IX/IX/U | IX/IX/X | IX/X/— | IX/X/— |
|  | UR | IN/IN/— | IX/IX/U | IX/IX/X | IX/X/— | IX/X/— |
| Non-Dimensional Predicates | RR | IS/S/— | IX/IX/S | IX/IX/X | IX/IX/S | IX/IX/X |
|  | RS | IS/IS/NS | IX/IX/U | IX/IX/X | IX/IX/U | IX/IX/X |
|  | CS | IS/IS/NS | IX/IX/U | IX/IX/X | IX/IX/U | IX/IX/X |
|  | UR | IN/IN/— | IX/IX/U | IX/IX/X | IX/IX/U | IX/IX/X |

In the subsections that follow, categories of block index scans that mirror the three primary columns of Table 4 are described.

(4)(b)(i) Read Only Block Index Scans

As shown in Table 4, for RR scans with no predicates, the MDC table 30 is locked S and neither block nor record locking is performed as an S table lock prevents I/U/D activity in the MDC table 30 by concurrent processes.

For RR scans with predicates of any kind, the MDC table 30 is locked IS and each block is locked S as it is encountered. As this is a block index scan, not all of the blocks of MDC table 30 may necessarily be accessed, thus other transactions may access the blocks not involved in the block index scan. Because each encountered block is locked S, row locking is not required; the S lock prevents any I/U/D activity on the block by concurrent processes.

CS and RS scans lock the MDC table 30 IS. Blocks are locked IS as they are encountered to ensure that the block index scan does not miss uncommitted deleted blocks. Rows are locked share (e.g. NS) once the block is scanned.

UR scans lock the MDC table 30 IN and block IN and do not perform record locking.

(4)(b)(ii) Cursored Operation Block Index Scans

For RR scans having no predicates, the MDC table 30 is IX locked, and blocks are IX locked as they are encountered. Although each row in the block may ultimately be X locked, a cursor is being used which may introduce a significant delay. The IX lock may allow concurrent scanners to access the block in the meantime. The scan to position the cursor scans the row in the block and locks them S. S locks are used to provide as much concurrency as possible as a significant amount of time may elapse between the scan and the update.

For RR scans having predicates, the MDC table 30 and blocks are locked IX as described above and rows are locked S during the cursor scan. This is because the record lock may only be upgraded to X if the row qualifies the predicates when it is processed, yet if the row does not qualify, it cannot be unlocked (as this is an RR scan).

For CS, RS and UR scans, the MDC table 30 and the current block are IX locked and rows are locked U during the initial scan. When the positioned command is performed, predicates are evaluated (if any) and the row lock is upgraded to an X lock if the row qualifies. Otherwise, the row lock is released. If no rows in a block qualify, the block lock is released as well.

(4)(b)(iii) Searched Update and Delete Block Index Scans

For RR scans with no predicates, the MDC table 30 is simply locked X since all rows may be deleted or updated, and locks held.

For RR scans with dimensional predicates, the MDC table 30 is locked IX and the blocks are locked U as they are encountered in the index. The dimension predicates are applied and if the block qualifies, the block lock is upgraded to an X lock. Rows in the block need not be locked as the X block lock prevents concurrent access to the block.

RR scans with dimensional start and stop predicates only are predicates on dimension column(s) that define a range of values for those columns, e.g. "between 1 and 10" or ">5 and <15". For these RR scans, blocks are locked X as they are encountered pursuant to the block index (which index is typically chosen by the optimizer), as the block index scan indicates which blocks belong in the range. When each block is processed, row locking is not necessary as the X block lock prevents concurrent access to the block.

For RR scans having non-dimensional predicates, the MDC table 30 and each encountered block are locked IX up-front, as it cannot be known with certainty that every row in a block may qualify. Rows are locked S during the scan and upgraded to an X lock if the row qualifies the predicates. If the row does not qualify, the lock is kept since this is an RR scan.

For CS, RS and UR scans having no predicates, the MDC table 30 is locked IX and each block is locked X as it is encountered. Rows in the block need not be locked as the X block lock prevents concurrent access to the block. Despite the fact that all of the rows of MDC table 30 may be updated or deleted (as no predicates are applied), the MDC table 30 is not locked X. Rather, the MDC table 30 is locked IX to allow the most concurrency in the MDC table 30 during the scan on rows which have not yet been encountered.

For CS, RS and UR scans having only dimensional predicates, the MDC table 30 is locked IX and each block locked U as it is encountered. If the block qualifies, then the block lock is upgraded to X since all rows in the block may qualify. Rows in the block need not be locked as the X block lock prevents concurrent access to the block. If the block does not qualify, it can safely be skipped (unlocking it).

For CS, RS and UR scans having non-dimensional predicates, the MDC table 30 and block are locked IX. Since individual rows may or may not qualify, rows are initially locked U and upgraded to an X lock only if they qualify.

(4)(c) Row Index Scan

In overview, row index scans lock the block containing a row identified in a RID list before locking the actual row. This is done to avoid erroneous access to a row by one transaction in the event that another transaction is only doing block locking and not row locking. If the block containing the row associated with a RID is the same as for the previously encountered RID in the index then the existing block lock may be used.

In the case of a CS or RS RID scan, the block associated with a RID is locked before the row is locked in accordance with the coarser-to-finer granularity locking order described previously. When a row is locked to check for "committed-ness" of a delete transaction, the block lock is checked for a DELETE_IN_BLOCK attribute set by a concurrent transaction. When this attribute is absent, it is known that no rows have been deleted from the block by a concurrent process. Consequently, no block lock or row lock is needed and the RID may be safely skipped.

A UR RID scan differs from an CS or RS RID scan in that the UR scan does not lock any rows, so associated blocks do not require locking. Also, a RID UR scan may not occur in a block that is being reassigned to another cell. Moreover, in a RID UR scan, one row per RID is accessed, unlike a block index where many rows may be accessed for one BID, permitting the BID to be reused many rows into the scan after coming from the index.

Figure 15A:
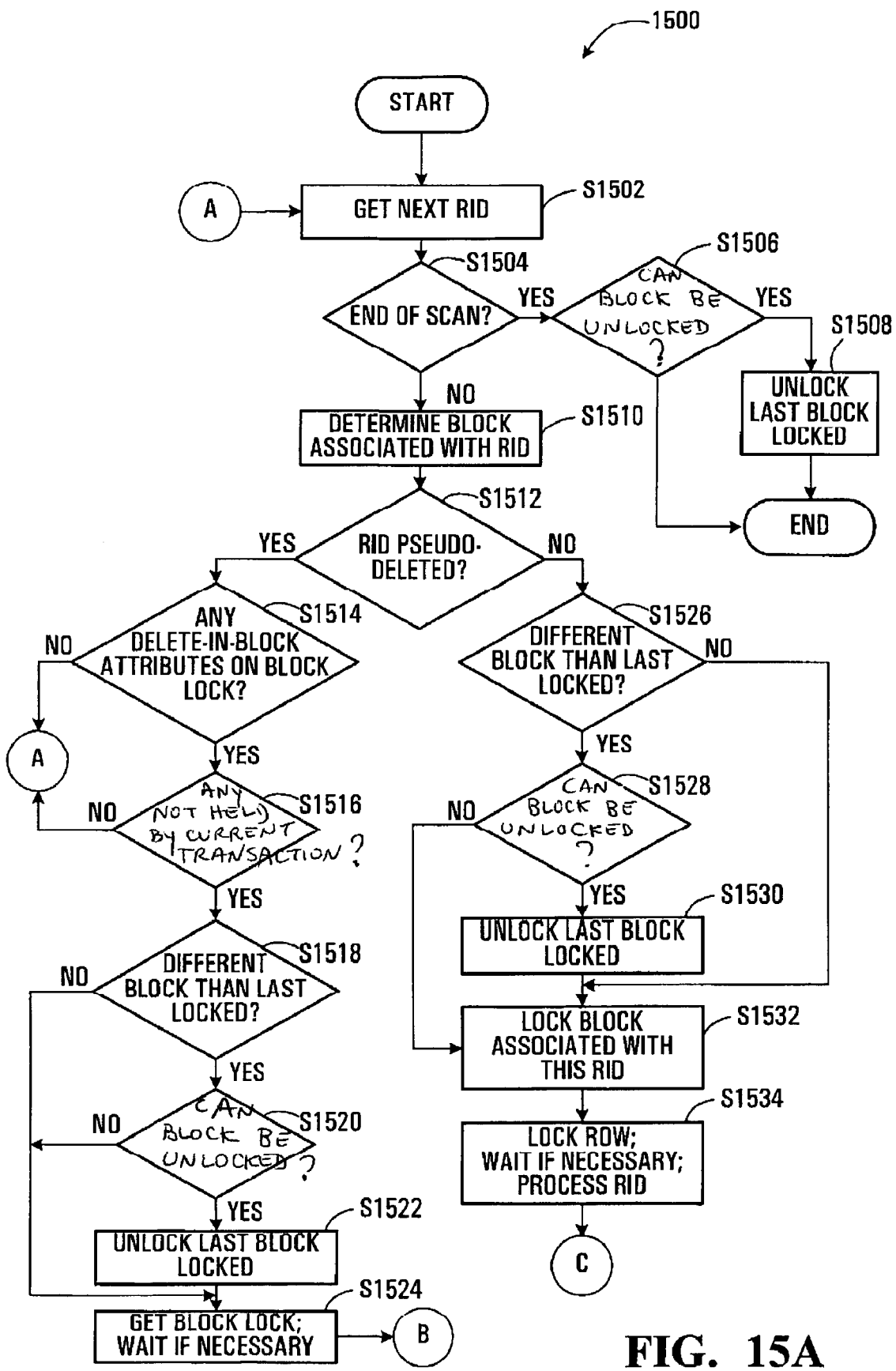
FIG. 15 is comprised of FIGS. 15A and 15B, and represents a process flow chart illustrating a method of operation for a CS or RS scan of a row index performed by the database system of FIG. 1.
Figure 15B:
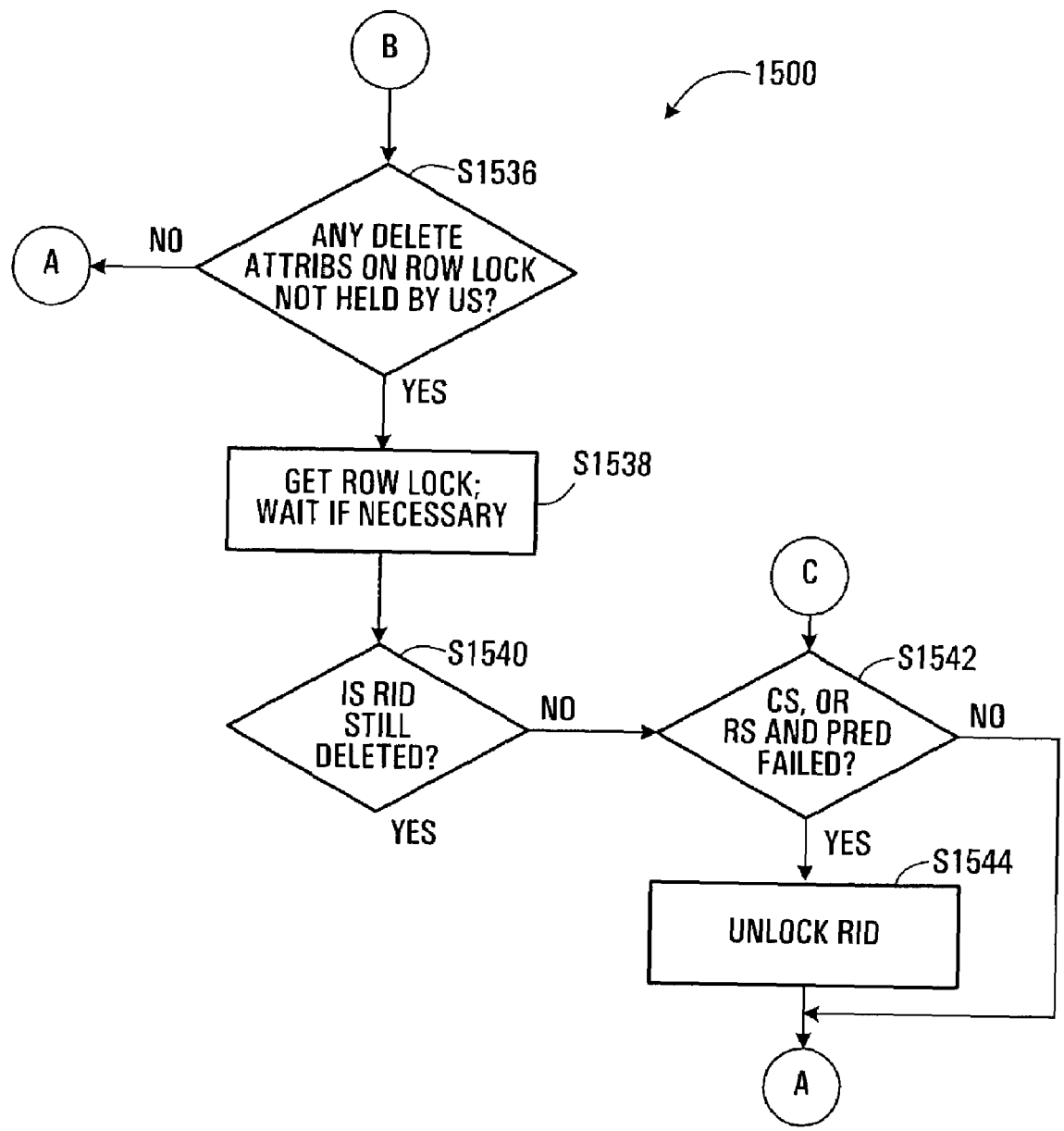

FIGS. 15A and 15B show operation 1500 for performing a CS or RS scan of row index 40. Referring to FIG. 15A, RIDs are accessed (S1502) until the scan is determined to have completed (S1504). For each RID, the block associated with the RID is determined (S1510) and the RID is checked for pseudo-deletion (S1512).

If the RID is found to have been pseudo-deleted, a further check is performed to determine whether a DELETE_IN_BLOCK attribute exists on the associated block's lock, indicating a delete is occurring within the block (S1514). If the attribute is not found to exist, the RID is skipped as it is known that the RID cannot have a DELETE attribute on its lock when the associated block lock lacks a DELETE_IN_BLOCK attribute. The next RID is then accessed (S1502). Pseudo-deletion and the DELETE attribute are distinct, with pseudo-deletion being an attribute of the RID stored in the index and DELETE being an attribute on the row or block lock. If the DELETE_IN_BLOCK attribute is found to exist for the associated block lock, a further check is made as to whether this attribute has been set by a concurrent transaction, that is, whether the attribute was set by a transaction other than the present transaction. That transaction may comprise many SQL statements; the present transaction may have set the DELETE_IN_BLOCK attribute in a previous statement with no commit having yet been issued. If the attribute is not set, or is set but has not been set by a concurrent transaction, it can be ignored (i.e. it is not necessary to obtain a lock on the block), and this RID can be safely skipped. The next RID is then accessed (S1502).

If however a concurrent transaction has set the DELETE_IN_BLOCK attribute on the block lock, it is known that a row in the block is deleted but as yet uncommitted and its RID is pseudo-deleted in the indexes. Consequently, it should be determined whether that row is the row whose RID is presently being scanned. It is determined whether the block associated with the current RID is different from the block of the last RID that was scanned (S1518). If the current block is not a new block, the current block is locked (with the lock type depending on the scan and isolation level), waiting as necessary (S1524). If the current block is a new block, it is next assessed whether the instant should unlock (i.e. decrement) the lock of the previous block (S1520). If the previous block's lock should be unlocked, it is in fact unlocked (S1522), and the current (i.e. new) block is locked (with the lock type depending on the scan and isolation level), waiting as necessary (S1524). If the previous block's lock should not be unlocked (S1520), the current (i.e. new) block is locked (with the lock type depending on the scan and isolation level), waiting as necessary (S1524). It is then determined whether the relevant row lock has any DELETE attributes set by a concurrent transaction (S1536, FIG. 15B). If not, processing continues with the next RID (S1502, FIG. 15A). Otherwise, the row lock is acquired (S1538, FIG. 15B).

Once the lock is acquired, it is determined whether the RID key is still pseudo-deleted (S1540, FIG. 15B). If it is no longer pseudo-deleted, predicates are evaluated. If the predicate evaluation fails (S1542), or this is CS, the RID is unlocked (S1544), otherwise the RID lock is maintained, and processing continues with the next RID (S1502, FIG. 15A).

If the RID is not found to be pseudo-deleted at S1512, a check is made as to whether the block associated with the current RID is different from the block of the last scanned RID (S1526). If the current block is not a new block, the current block is locked (with the lock type depending on the scan and isolation level), waiting as necessary (S1532). If the current block is a new block, it is next assessed whether the instant transaction should unlock the lock of the previous block (S1528). If the previous block's lock should not be unlocked (S1528), the current (i.e. new) block is locked (with the lock type depending on the scan and isolation level), waiting as necessary (S1532). If the previous block's lock should be unlocked, it is in fact unlocked (S1530), and the current (i.e. new) block is locked, waiting as necessary (S1532). Blocks are left in a locked state if any row locks are left in the block for isolation level semantics; the locks may be released when the transaction commits (except under WITH HOLD conditions).

A lock on the row associated with the current RID is acquired (S1534), and predicates (of the query resulting in the RID scan) are evaluated (S1542, FIG. 15B). If the predicate evaluation fails or this is CS (S1542), the RID is unlocked (S1544), otherwise the RID lock is maintained, and processing continues with the next RID (S1502, FIG. 15A).

Once the end of the scan is reached (S1504, FIG. 15A), then it is determined whether the last block can be unlocked (S1506). If so, it is unlocked (S1508), and operation 1500 completes.

As described in subsection (1)(c) "Insert RID Into Row Index", an RR_IN_BLOCK attribute is applied to the block lock during RR scans to avoid locking a block containing a row unnecessarily when it turns out that no row lock was applied by an RR scan. An RR attribute is then set on the RID lock.

Figure 16:
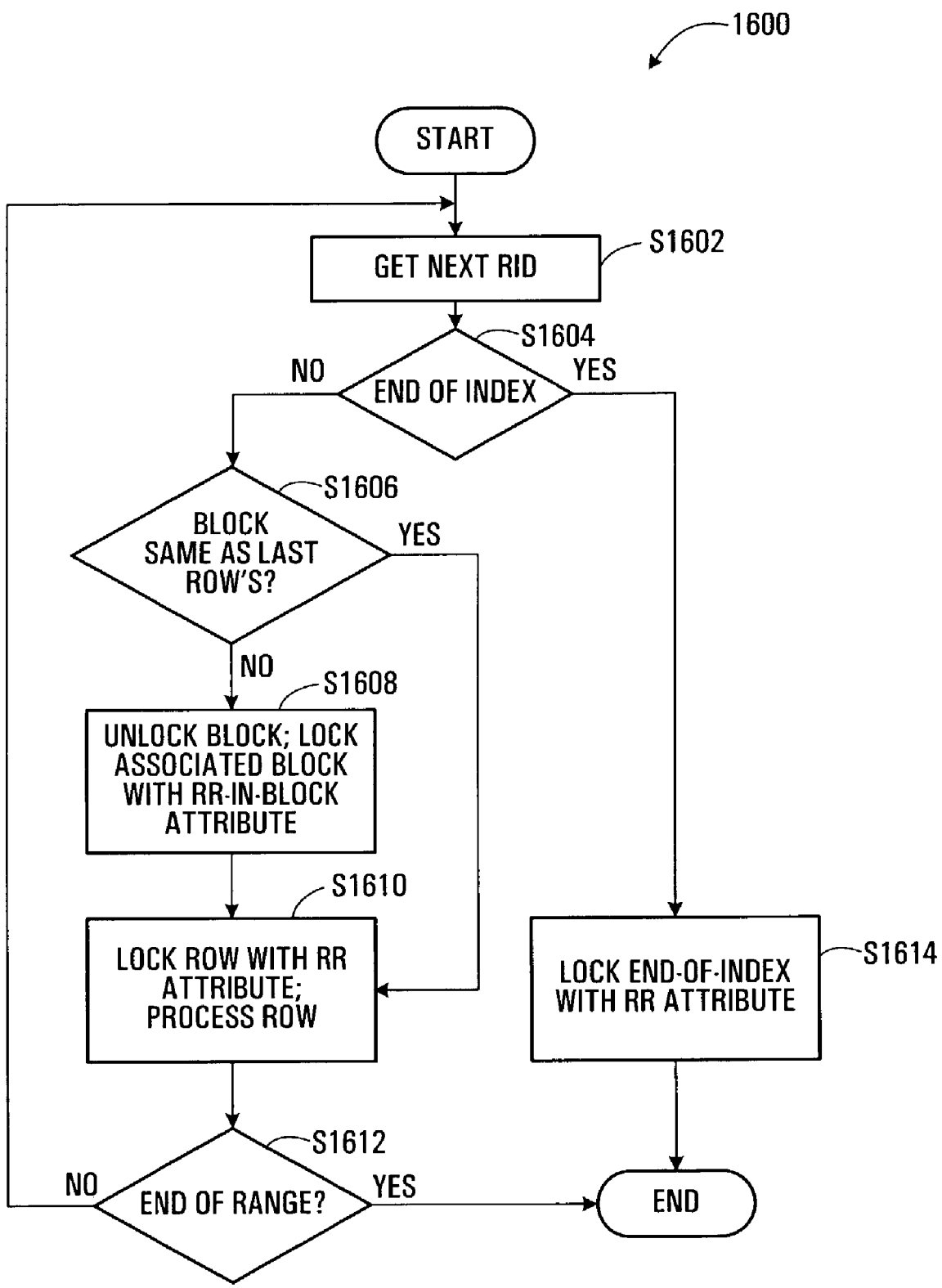
FIG. 16 is a process flow chart illustrating a method of operation for an RR scan of a row index performed by the database system of FIG. 1.

This is illustrated in FIG. 16, which shows operation 1600 for scanning a row index with isolation level RR. The RIDs are accessed in turn (S1602) until either the end of the index (S1604) or end of range (S1612) is reached. For each RID, it is determined whether the associated block is a different one than the one currently locked (i.e. if the associated block is different from the block associated with the most recently scanned RID) (S1606). If so, the currently locked block is unlocked if necessary and the new block is locked and its RR_IN_BLOCK attribute set (S1608). Since this is RR, when the currently locked block is unlocked, the scan just unlocks while the lock is protected. Thereafter the associated row is locked with the RR attribute being set and is processed (S1610). If the row exceeds the end of range defined by the operative predicate (S1612), operation 1600 terminates. If at S1606 the associated block is the block currently locked, the associated row is locked with the RR attribute being set and is processed (S1610). If the end of the row index is reached (S1604), the End Of Index is locked with the RR attribute being set (S1614). There is no need to lock the block when the EOI is locked; no block is associated with the EOI since it is not actually a row in the MDC table 30.

Table 5 summarizes the type of locks applied at each of the levels of granularity of the present embodiment during a row index scan for various predicate scenarios. Table 5 follows the conventions of Table 3 above.

TABLE 5

Locks Applied During Row Index Scans

| Access Method | Isolation Level | Read Only Scans | Cursored Operation Scan | Cursored Operation Where Current Of | Searched Update Or Delete Scan/ Delete | Searched Update Or Delete Scan/ Update |
|---|---|---|---|---|---|---|
| No Predicates | RR | S/—/— | IX/IX/S | IX/IX/X | X/—/— | X/—/— |
| | RS | IS/IS/NS | IX/IX/U | IX/IX/X | IX/IX/X | IX/IX/X |
| | CS | IS/IS/NS | IX/IX/U | IX/IX/X | IX/IX/X | IX/IX/X |
| | UR | IN/—/— | IX/IX/U | IX/IX/X | IX/IX/X | IX/IX/X |
| Single Qualifying Record | RR | IS/IS/S | IX/IX/U | IX/IX/X | IX/IX/X | IX/IX/X |
| | RS | IS/IS/NS | IX/IX/U | IX/IX/X | IX/IX/X | IX/IX/X |
| | CS | IS/IS/NS | IX/IX/U | IX/IX/X | IX/IX/X | IX/IX/X |
| | UR | IN/—/— | IX/IX/U | IX/IX/X | IX/IX/X | IX/IX/X |
| Start and Stop Predicates Only | RR | IS/IS/S | IX/IX/S | IX/IX/X | IX/IX/X | IX/IX/X |
| | RS | IS/IS/NS | IX/IX/U | IX/IX/X | IX/IX/X | IX/IX/X |
| | CS | IS/IS/NS | IX/IX/U | IX/IX/X | IX/IX/X | IX/IX/X |
| | UR | IN/—/— | IX/IX/U | IX/IX/X | IX/IX/X | IX/IX/X |
| Index Predicates Only or Non-Index Predicates | RR | IS/IS/S | IX/IX/S | IX/IX/X | IX/IX/S | IX/IX/X |
| | RS | IS/IS/NS | IX/IX/U | IX/IX/X | IX/IX/U | IX/IX/X |
| | CS | IS/IS/NS | IX/IX/U | IX/IX/X | IX/IX/U | IX/IX/X |
| | UR | IN/—/— | IX/IX/U | IX/IX/X | IX/IX/U | IX/IX/X |

In the subsections that follow, categories of row index scans that mirror the primary columns of Table 5 are described.

(4)(c)(i) Read Only Row Index Scans

As shown in Table 5, for RR scans with no predicates, the entire MDC table 30 is locked S and neither block nor row locking is performed as the S table lock prevents I/U/D activity in the MDC table 30.

For RR scans with predicates of any kind, the MDC table 30 and block are locked IS and each row is locked S as it is encountered. As this is a row index scan, not all rows may necessarily be accessed; consequently, other transactions are permitted to access rows not involved in the row index scan.

CS and RS scans lock the MDC table 30 and block IS, and lock rows NS as they are scanned in the index.

UR scans lock the MDC table 30 IN only and do not do block or row locking.

(4)(c)(ii) Cursored Operation Row Index Scans

For RR scans having no predicates, the MDC table 30 is locked IX. For each RID encountered, the associated block is determined and locked IX. The associated row is then locked S. Although each row in the block may ultimately be updated or deleted and thus X locked, a cursor is being used which may introduce a significant delay. The IX lock may allow concurrent scanners to access the block in the meantime. S row locks are used to provide as much concurrency as possible, as a significant amount of time may elapse between the scan and the update. The row lock is upgraded to X when a current of cursor operation is performed.

For CS, RS and UR scans, the MDC table 30 and the block are locked IX and the rows are locked U during the initial scan. When the positioned update/delete is performed, predicates (if any) are evaluated and the row lock is upgraded to an X lock if the row qualifies. Otherwise, the row lock is released. If no rows in a block qualify, the block lock is released as well.

(4)(c)(iii) Searched Update or Delete Row Index Scans

For RR scans with no predicates, the MDC table 30 is simply locked X since all rows may be deleted. No block or row locks are applied.

For RR scans, with either RID start and stop predicates only or a single qualifying row the MDC table 30 is initially locked IX as are blocks; it cannot be known with certainty that every row in a block may qualify. Accessed rows are locked X since it is known that each of the RIDs in the scan qualifies.

For RR scans, when index or other predicates (such as dimension predicates) exist the MDC table 30 is locked IX. Associated blocks are determined and locked IX as well. Rows are locked S as they are encountered, with the row lock being upgraded to X if the row qualifies. If it does not qualify, the S row locks are maintained.

For CS, RS and UR scans, when no predicates exist the MDC table 30 is locked IX, the block associated with the RID is determined, and it is locked IX as well. Each row is then locked X as it is encountered, as all rows in the scan may qualify.

For CS, RS and UR scans, when there are only RID index start and stop predicates or a single qualifying row the MDC table 30 is locked IX, the block associated with the RID is determined, and it is locked IX as well. Each row is then locked X as it is encountered, as all rows in the scan may qualify.

For CS, RS and UR scans, when there are index or other predicates (such as dimension predicates) the MDC table 30 and identified block are both locked IX. Since individual rows may or may not qualify, rows are initially locked U. Only if the individual rows qualify is this lock upgraded to X.

As may be appreciated by those skilled in the art, modifications to the above-described embodiment can be made without departing from the essence of the invention. For example, although the present embodiment shows a three-level locking hierarchy for an MDC table 30 in which data is clustered into block comprising rows, it is possible for a similar hierarchy to be employed on other database data structures employing dimensional data clustering. Such data structures may or may not describe groups of physically clustered data as "blocks".

Alternatively, an embodiment having blocks that are only large enough to contain a single page may be implemented.

In another alternative, additional levels of locking (e.g. at the page level) beyond the row, block, and table level locking described herein may exist.

A multi-level locking hierarchy could be implemented for a database system 10 in which the RDBMS 12 is not SQL compatible but has comparable capabilities in another database query language.

It is to be understood that the specific embodiments of the invention that have been described are merely illustrative of certain application of the principle of the present invention. Numerous modifications may be made to system and method for a multi-level locking hierarchy in a database with multi-dimensional clustering invention described herein without departing from the spirit and scope of the present invention.

What is claimed is:

1. A processor-implemented method of directing a database management system to lock data in a database, comprising:
   providing a first locking level for individually locking blocks of data that are physically clustered by dimension, in a multi-dimensionally clustered table contained in the database;
   providing a second locking level for locking the multi-dimensionally clustering table;
   providing a third locking level for individually locking rows within the blocks of data;
   wherein the second locking level is higher than the first locking level;
   wherein the first locking level is higher than the third locking level; and
   wherein the method further comprises applying a single lock to the blocks of data at higher locking levels, upon determining that a majority of the blocks of data at a lower locking level requires locking.

2. The method of claim 1, wherein the single lock is stronger than locks at the lower locking level.

3. The method of claim 1, further comprising setting a delete-in-block indicator to indicate that at least one row in the blocks of data is to be deleted and is uncommitted.

4. The method of claim 3, wherein the delete-in-block indicator is associated with a lock on the block of data at the locking level.

5. The method of claim 3, wherein the database contains a row index for a column of the table; and
   wherein the method further comprises setting a pseudo-deletion indicator associated with a row index key, to indicate that the row is to be deleted.

6. The method of claim 5, further comprising skipping the row index key if the delete-in-block indicator associated with the lock on the block of data containing the row, indicates that no rows in the block of data are deleted and uncommitted, during a cursor stability and read stability scan of the row index, upon detecting the pseudo-deletion indicator for the row index key.

7. The method of claim 6, further comprising skipping the row index key if each row to be deleted from the block of data is to be deleted by the current transaction.

8. The method of claim 1, further comprising causing an uncommitted read scan of a data block associated with a logical cell, to avoid returning further rows, upon determining that the data block may be reused with a different logical cell.

9. The method of claim 8, wherein causing the uncommitted read scan of the data block comprises requesting in a transaction, a lock associated with the data block at the locking level that is incompatible with a lock associated with the data block held at the locking level by a concurrent transaction performing the uncommitted read scan.

10. The method of claim 9, wherein causing the uncommitted read scan of the data block further comprises requesting a super-exclusive lock.

11. The method of claim 8, wherein the uncommitted read scan is performed in the transaction; and
wherein causing the uncommitted read scan of the data block comprises setting an indicator in the transaction to indicate that the data block has been emptied.

12. The method of claim 1, further comprising causing an uncommitted read scan of a data block to return no further rows, upon determining that the data block has been emptied.

13. The method of claim 1, further comprising setting a lock at a locking level associated with the data block containing a row, upon determining that the row qualifies predicates of a database query.

14. The method of claim 13, wherein setting the lock at the locking level comprises setting another lock associated with the data block that results from a scan of the data block.

15. The method of claim 14, further comprising refraining from any setting of the lock associated with the data block, upon determining that at least one row of the data block qualifies the predicates.

16. The method of claim 1, wherein the database comprises a row index for a column of the table;
wherein the method further comprises setting an indicator for each data block containing a row identified by a row index key in arrange, upon the occurrence of a repeatable read scan of the row index; and
wherein the indicator indicates that a repeatable read scan is occurring for at least one row within each data block.

17. The method of claim 1, wherein the database contains a block index for a dimension of the table, in which keys are capable of being individually locked; and
wherein the method further comprises setting an indicator for each block index key within the range, to indicate that a repeatable read scan is occurring with respect to each block index key, upon a ranged repeatable read scan of the block index.

18. The method of claim 17, further comprising inserting a new block index key into the block index, without locking the block index key following a determined new block index key insertion point within the block index, when the indicator for the following block index key has not been set by a concurrent transaction, to indicate that a repeatable read scan is occurring with respect to a following block index key.

19. A computer program product having instruction codes stored on a computer-useable medium for directing a database management system to lock data in a database, comprising:
a first set of instruction codes for providing a first locking level for individually locking blocks of data that are physically clustered by dimension, in a multi-dimensionally clustered table contained in the database;
a second set of instruction codes for providing a second locking level for locking the multi-dimensionally clustering table; and
a third set of instruction codes for providing a third locking level for individually locking rows within the blocks of data;
wherein the second locking level is higher than the first locking level;
wherein the first locking level is higher than the third locking level; and
further comprising a fourth set of instruction codes for applying a single lock to the blocks of data at higher locking levels, upon determining that a majority of the blocks of data at a lower locking level requires locking.

20. The computer program product of claim 19, wherein the single lock is stronger than locks at the lower locking level.

21. The computer program product of claim 19, further comprising a fifth set of instruction codes for setting a delete-in-block indicator to indicate that at least one row in the blocks of data is to be deleted and is uncommitted.

22. The computer program product of claim 21, wherein the delete-in-block indicator is associated with a lock on the block of data at the locking level.

23. The computer program product of claim 21, wherein the database contains a row index for a column of the table; and
further comprising a sixth set of instruction codes for setting a pseudo-deletion indicator associated with a row index key, to indicate that the row is to be deleted.

24. The computer program product of claim 23, further comprising a seventh set of instruction codes for skipping the row index key if the delete-in-block indicator associated with the lock on the block of data containing the row, indicates that no rows in the block of data are deleted and uncommitted, during a cursor stability and read stability scan of the row index, upon detecting the pseudo-deletion indicator for the row index key.

25. The computer program product of claim 24, further comprising an eight set of instruction codes for skipping the row index key if each row to be deleted from the block of data is to be deleted by the current transaction.

26. The computer program product of claim 19, further comprising a ninth set of instruction codes for causing an uncommitted read scan of a data block associated with a logical cell, to avoid returning further rows, upon determining that the data block may be reused with a different logical cell.

27. A processor-implemented data processing system for directing a database management system to lock data in a database, comprising:
means for providing a first locking level for individually locking blocks of data that are physically clustered by dimension, in a multi-dimensionally clustered table contained in the database;
means for providing a second locking level for locking the multi-dimensionally clustering table; and
means for providing a third locking level for individually locking rows within the blocks of data;
wherein the second locking level is higher than the first locking level;
wherein the first locking level is higher than the third locking level; and
further means for applying a single lock to the blocks of data at higher locking levels, upon determining that a majority of the blocks of data at a lower locking level requires locking.

28. The data processing system of claim 27, wherein the single lock is stronger than locks at the lower locking level.

29. The data processing system of claim 27, further comprising means for setting a delete-in-block indicator to indicate that at least one row in the blocks of data is to be deleted and is uncommitted.

30. The data processing system of claim 29, wherein the delete-in-block indicator is associated with a lock on the block of data at the locking level.

31. The data processing system of claim 29, wherein the database contains a row index for a column of the table; and further comprising means for setting a pseudo-deletion indicator associated with a row index key, to indicate that the row is to be deleted.

32. The data processing system of claim 31, further comprising means for skipping the row index key if the delete-in-block indicator associated with the lock on the block of data containing the row, indicates that no rows in the block of data are deleted and uncommitted, during a cursor stability and read stability scan of the row index, upon detecting the pseudo-deletion indicator for the row index key.

33. The data processing system of claim 32, further comprising means for skipping the row index key if each row to be deleted from the block of data is to be deleted by the current transaction.

34. The data processing system of claim 27, further comprising means for causing an uncommitted read scan of a data block associated with a logical cell, to avoid returning further rows, upon determining that the data block may be reused with a different logical cell.

* * * * *